(12) United States Patent
Yamakawa et al.

(10) Patent No.: US 11,307,808 B2
(45) Date of Patent: Apr. 19, 2022

(54) PRINT MANAGEMENT SYSTEM TO SET ADJUSTMENT VALUE INFORMATION ABOUT SHEET FEEDING CASSETTES

(71) Applicant: CANON KABUSHIKI KAISHA, Tokyo (JP)

(72) Inventors: Junichi Yamakawa, Kashiwa (JP); Yuzo Harano, Sagamihara (JP); Hideaki Ooba, Yokohama (JP); Aya Ito, Tokyo (JP); Nobuhiro Kawamura, Nagareyama (JP); Yusuke Kimura, Abiko (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 16/041,189

(22) Filed: Jul. 20, 2018

(65) Prior Publication Data

US 2019/0037091 A1    Jan. 31, 2019

(30) Foreign Application Priority Data

Jul. 27, 2017 (JP) .............................. JP2017-145104

(51) Int. Cl.
  *G06F 3/12* (2006.01)
  *H04N 1/00* (2006.01)
(52) U.S. Cl.
  CPC .......... *G06F 3/1204* (2013.01); *G06F 3/1257* (2013.01); *H04N 1/00708* (2013.01);
  (Continued)
(58) Field of Classification Search
  CPC combination set(s) only.
  See application file for complete search history.

(56) References Cited

U.S. PATENT DOCUMENTS

| | | | |
|---|---|---|---|
| 2009/0189330 A1* | 7/2009 | Saito | B65H 3/44 |
| | | | 271/9.05 |
| 2011/0135322 A1* | 6/2011 | Masuyama | B41J 11/485 |
| | | | 399/16 |

(Continued)

FOREIGN PATENT DOCUMENTS

| | | |
|---|---|---|
| JP | 2008-096812 A | 4/2008 |
| JP | 2012-089043 A | 5/2012 |

(Continued)

*Primary Examiner* — Barbara D Reinier
(74) *Attorney, Agent, or Firm* — Canon U.S.A., Inc. IP Division

(57) ABSTRACT

A print management system having a control apparatus and an image forming apparatus with sheet feeding cassettes includes a sheet data registration unit to register sheet data indicating an attribute of each print sheet, a sheet feeding cassette selection unit to select a sheet feeding cassette, and a sheet data selection unit to select sheet data about at least one type of print sheet from the registered sheet data. An adjustment value setting unit sets adjustment value information during image formation while feeding the selected print sheet and a database setting unit sets, in association with each other, the attribute of the selected sheet feeding cassette, the selected sheet data about the print sheet, and the set adjustment value information. The database setting unit allows setting to one piece of sheet data adjustment value information about each sheet feeding cassette selected by the sheet feeding cassette selection unit.

9 Claims, 21 Drawing Sheets

(52) U.S. Cl.
CPC ..... *H04N 1/00724* (2013.01); *H04N 1/00726* (2013.01); *H04N 1/00771* (2013.01)

(56) References Cited

U.S. PATENT DOCUMENTS

| | | | |
|---|---|---|---|
| 2015/0160902 A1* | 6/2015 | Tsujita | G06F 3/1288 358/1.6 |
| 2016/0274827 A1* | 9/2016 | Kogusuri | G06F 3/1205 |
| 2018/0152572 A1* | 5/2018 | Yano | H04N 1/00435 |

FOREIGN PATENT DOCUMENTS

| | | | |
|---|---|---|---|
| JP | 2014-069498 A | | 4/2014 |
| JP | 2015-112745 A | | 6/2015 |
| JP | 2015-125634 | * | 6/2015 |
| JP | 201693943 A | | 5/2016 |

* cited by examiner

FIG.7A

| | 701 | 702 | 703 | 704 | 705 | 706 | 707 | 708 | 709 | 710 | 711 | 712 | 713 | 714 | 715 | 716 | 717 |
|---|---|---|---|---|---|---|---|---|---|---|---|---|---|---|---|---|---|
| | ID | NAME | GRAMMAGE (gsm) | SIZE | SURFACE PROPERTY | FORM | COLOR | USABLE SHEET FEEDING CASSETTE | DUPLEX-PRINTING SECOND SIDE | IMAGE POSITION (LEADING EDGE) | IMAGE POSITION (LEFT EDGE) | CURL CORRECTION | SADDLE FOLD POSITION | CREEP CORRECTION AMOUNT | SECONDARY TRANSFER VOLTAGE | SECONDARY TRANSFER STATIC ELIMINATION BIAS | PRIMARY TRANSFER VOLTAGE |
| 718 | 001 | THICK PAPER | 300 | A4 | HIGH-QUALITY PAPER | NORMAL | WHITE | NONE SPECIFIED | 0 | 0.2 | -0.3 | 0.4 | 1.2 | 0.05 | -2 | +3 | +3 |
| 719 | 002 | BOTH-SIDE COATED PAPER | 105 | A4 | BOTH-SIDE COATED | NORMAL | WHITE | NONE SPECIFIED | 0 | 0 | 0 | 0 | 0 | 0 | 0 | 0 | 0 |
| 720 | 003 | ONE-SIDE COATED PAPER | 105 | A4 | ONE-SIDE COATED | NORMAL | WHITE | NONE SPECIFIED | 0 | 0 | 0 | 0 | 0 | 0.08 | +3 | 0 | 0 |
| 721 | 004 | | | | | | | | | | | | | | | | |
| 722 | 005 | | | | | | | | | | | | | | | | |

FIG.7B

| 701 | 702 | 703 | 705 | 706 | 707 | 709 | 710 | 711 | 712 | 713 | 714 | 715 | 716 | 717 |
|---|---|---|---|---|---|---|---|---|---|---|---|---|---|---|
| ID | NAME | GRAMMAGE (gsm) | SURFACE PROPERTY | FORM | COLOR | DUPLEX-PRINTING SECOND SIDE | IMAGE POSITION (LEADING EDGE) | IMAGE POSITION (LEFT EDGE) | CURL CORRECTION | SADDLE FOLD POSITION | CREEP CORRECTION AMOUNT | SECONDARY TRANSFER VOLTAGE | SECONDARY TRANSFER STATIC ELIMINATION BIAS | PRIMARY TRANSFER VOLTAGE |
| 001 | THIN PAPER 64 | 64 | HIGH-QUALITY PAPER | NORMAL | WHITE | 0 | 0 | 0 | 0 | 0 | 0 | 0 | 0 | 0 |
| 002 | PLAIN PAPER 80 | 80 | HIGH-QUALITY PAPER | NORMAL | WHITE | 0 | 0 | 0 | 0 | 0 | 0 | 0 | 0 | 0 |
| 003 | PLAIN PAPER 150 | 105 | HIGH-QUALITY PAPER | NORMAL | WHITE | 0 | 0 | 0 | 0 | 0 | 0 | 0 | 0 | 0 |

SHEET MANAGEMENT

[CREATE NEW] [EDIT] [COPY] [DELETE] [CLOSE] [TO SHEET TEMPLATE]

USABLE SHEETS

| NAME | GRAMMAGE | SIZE | SURFACE PROPERTY | FEATURE | COLOR | USABLE SHEET FEEDING CASSETTE | DUPLEX-PRINTING SECOND SIDE |
|---|---|---|---|---|---|---|---|
| THICK PAPER | 300 | A4 | HIGH-QUALITY PAPER | NORMAL | WHITE | NONE SPECIFIED | No |
| BOTH-SIDE COATED PAPER | 105 | A4 | BOTH-SIDE COATED | NORMAL | WHITE | NONE SPECIFIED | No |
| ONE-SIDE COATED PAPER | 105 | A4 | ONE-SIDE COATED | NORMAL | WHITE | NONE SPECIFIED | No |
| OHP | 180 | A4 | OHP | FILM | TRANSPARENT | NONE SPECIFIED | No |
| RECYCLED PAPER | 105 | A4 | RECYCLED PAPER | NORMAL | WHITE | NONE SPECIFIED | No |
| INDEX PAPER | 157 | A3 | HIGH-QUALITY PAPER | INDEX | WHITE | NONE SPECIFIED | No |
| THICK PAPER 209_DECK 2 | 209 | A3 | HIGH-QUALITY PAPER | NORMAL | WHITE | DECK 2 | No |
| BOTH-SIDE COATED PAPER 157 | 157 | A3 | BOTH-SIDE COATED | NORMAL | WHITE | NONE SPECIFIED | No |
| ONE-SIDE COATED PAPER_A3 | 105 | A3 | ONE-SIDE COATED | NORMAL | WHITE | NONE SPECIFIED | No |
| ONE-SIDE COATED PAPER 209 | 209 | A4 | ONE-SIDE COATED | NORMAL | WHITE | NONE SPECIFIED | No |
| PLAIN PAPER_A4_DECK 1 | 80 | A4 | HIGH-QUALITY PAPER | NORMAL | WHITE | DECK 1 | No |

FIG.8B

SHEET MANAGEMENT

[CREATE NEW] [EDIT] [COPY] [DELETE] [CLOSE]

[TO USABLE SHEET LIST]

USABLE SHEETS

| SHEET NAME | GRAMMAGE | SURFACE PROPERTY | FEATURE | COLOR | DUPLEX-PRINTING SECOND SIDE | IMAGE POSITION ADJUSTMENT | CURL CORRECTION |
|---|---|---|---|---|---|---|---|
| THIN PAPER 64 | 64 | HIGH-QUALITY PAPER | NORMAL | WHITE | | NONE SPECIFIED | NOT ADJUSTED |
| PLAIN PAPER 80 | 80 | HIGH-QUALITY PAPER | NORMAL | WHITE | No | NONE SPECIFIED | NOT ADJUSTED |
| PLAIN PAPER 105 | 105 | HIGH-QUALITY PAPER | NORMAL | WHITE | No | NONE SPECIFIED | NOT ADJUSTED |
| THICK PAPER 157 | 157 | HIGH-QUALITY PAPER | NORMAL | WHITE | No | NONE SPECIFIED | NOT ADJUSTED |
| THICK PAPER 209 | 209 | HIGH-QUALITY PAPER | NORMAL | WHITE | No | NONE SPECIFIED | NOT ADJUSTED |
| THICK PAPER 257 | 257 | HIGH-QUALITY PAPER | NORMAL | WHITE | No | NOT ADJUSTED | NOT ADJUSTED |
| THICK PAPER 300 | 300 | HIGH-QUALITY PAPER | NORMAL | WHITE | No | NONE SPECIFIED | NOT ADJUSTED |
| ONE-SIDE COATED PAPER 105 | 157 | ONE-SIDE COATED | NORMAL | WHITE | No | NONE SPECIFIED | NOT ADJUSTED |
| ONE-SIDE COATED PAPER 157 | 105 | ONE-SIDE COATED | NORMAL | WHITE | No | NONE SPECIFIED | NOT ADJUSTED |
| ONE-SIDE COATED PAPER 209 | 209 | ONE-SIDE COATED | NORMAL | WHITE | No | NONE SPECIFIED | NOT ADJUSTED |
| ONE-SIDE COATED PAPER 257 | 80 | | | | | NOT ADJUSTED | NOT ADJUSTED |

FIG.9

SHEET EDIT — 901

[SAVE] 904   [CANCEL] 905   [CLOSE] 906   ☑ CREATE MULTIPLE PIECES OF SHEET DATA SIMULTANEOUSLY 907   [SET] 908

SHEET INFORMATION — 902

- NAME: THICK PAPER ▲ — 909
- GRAMMAGE: 300 g/m² — 910
- SIZE: A4 ▼ — 911
- SURFACE PROPERTY: HIGH-QUALITY PAPER ▼ — 912
- FEATURE: NORMAL ▼ — 913
- COLOR: WHITE ▼ — 914
- DUPLEX-PRINTING SECOND SIDE: No ▼ — 915
- USABLE SHEET FEEDING CASSETTE: NONE SPECIFIED ▼ — 916
- IMAGE POSITION ADJUSTMENT: ADJUSTED ▲ — 917
- CURL CORRECTION: NOT ADJUSTED ▲ — 918
- ADJUSTMENT OF SADDLE FOLD POSITION: 0 mm ▲ — 919
- ADJUSTMENT OF CREEP CORRECTION AMOUNT: 0 mm ▲ — 920
- SADDLE STITCH POSITION CHANGE: 0 mm ▲ — 921
- ADJUSTMENT OF SECONDARY TRANSFER VOLTAGE: NOT ADJUSTED ▲ — 922
- ADJUSTMENT OF SECONDARY TRANSFER STATIC ELIMINATION BIAS: NOT ADJUSTED ▲ — 923
- ADJUSTMENT OF PRIMARY TRANSFER VOLTAGE: NOT ADJUSTED ▲ — 924

— 903

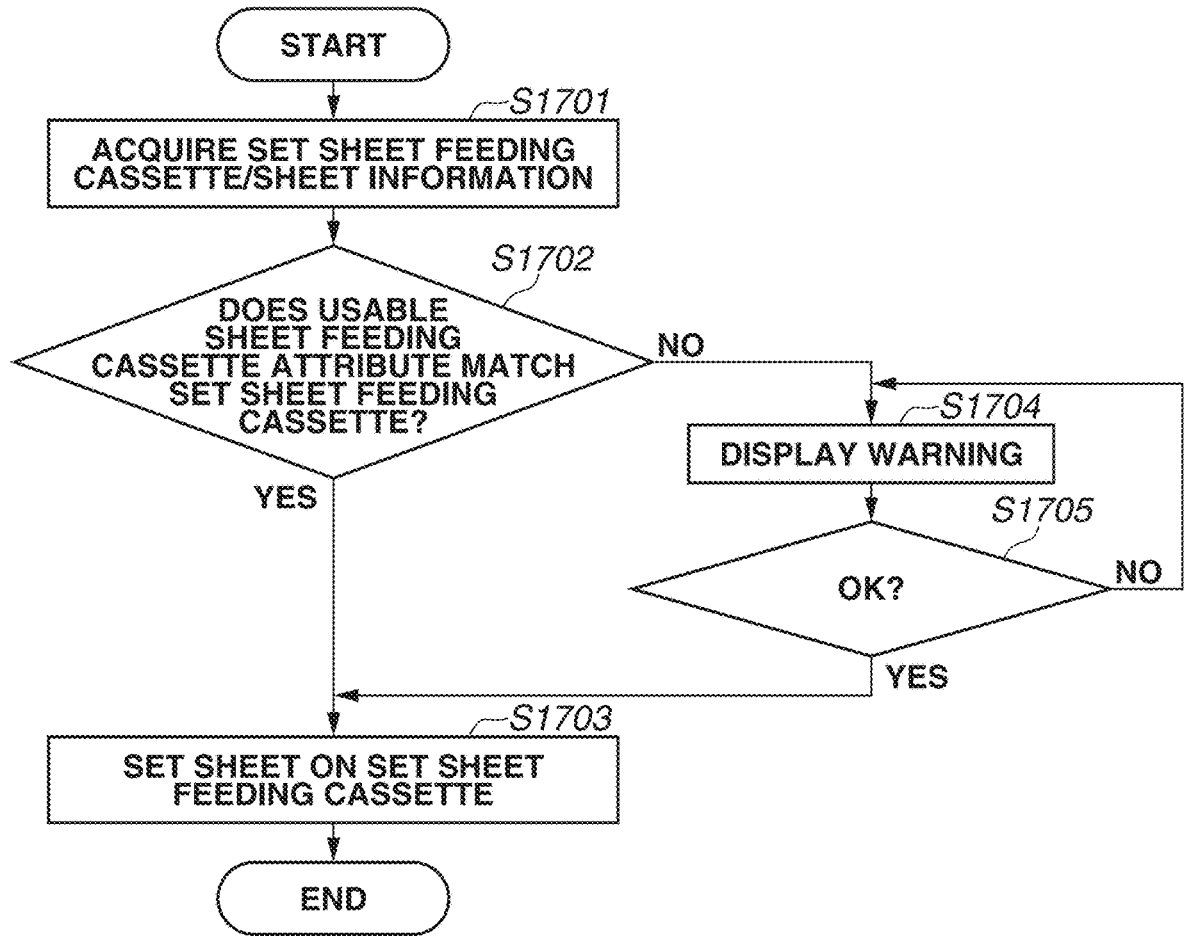

FIG.19

SHEET CREATION SETTING — 1901

[ SAVE ] — 1904    [ CANCEL ] — 1905

SHEET SIZE — 1902

- ☐ A5  ☑ A4  ☑ A3  ☑ SRA3
- ☐ B5  ☑ B4
- ☐ LTR  ☐ 11 × 17  ☐ LGL  ☐ 13 × 19

USABLE SHEET FEEDING CASSETTE — 1903

- ☑ DECK 1    ☑ DECK 2
- ☐ LONG DECK
- ☐ INSERTER 1    ☐ INSERTER 2

PRINT MANAGEMENT SYSTEM TO SET ADJUSTMENT VALUE INFORMATION ABOUT SHEET FEEDING CASSETTES

BACKGROUND OF THE INVENTION

Field of the Invention

The present disclosure relates to a print management system, a print management method, and a storage medium for managing sheet information to be used during printing.

Description of the Related Art

A print unit provided in a print management system is capable of performing printing using various types of sheets having different sheet attributes including a size, grammage, and a surface property such as coated paper or high-quality paper. These sheet attributes are managed using a sheet database provided in the print management system. Not only a name, a sheet size, grammage, a surface property such as coated paper or high-quality paper, and a form such as index paper or punched paper, are managed as sheet attributes, but also adjustment values for image position, image margin, and the like are managed for each sheet attribute, i.e., for each sheet type. Sheets to be used for printing are set using the sheet database so that the sheets can be accommodated in various types of sheet feeding devices, such as a cassette, a manual feed tray, and a paper deck.

There is a use case where the adjustment value is set to each sheet feeding cassette to be used for the same sheet type owing to the difference in mechanical characteristics or sheet conveyance paths of the sheet feeding cassettes, so that there is a need for changing the type of sheets for the sheet feeding cassette to be used, or setting an adjustment value every time the sheet feeding cassette is changed. For example, in an image position adjustment, a printing position of a printed material to be produced may be shifted due to a difference between structures of sheet feeding cassettes. In correcting a curl, a sheet curled state may vary depending on a difference in temperature characteristics or moisture characteristics of sheets due to a difference between conveyance paths.

In this regard, a method of setting, for each sheet feeding cassette, an image position adjustment value to a sheet database according to the type of each sheet that can be set in the sheet feeding cassette, is described in, for example, Japanese Patent Application Laid-Open No. 2016-93943.

SUMMARY OF THE INVENTION

According to an aspect of the present invention, a print management system including a control apparatus and an image forming apparatus having a plurality of sheet feeding cassettes, includes a sheet data registration unit configured to register, for each of a plurality of types of print sheets, sheet data indicating an attribute of each print sheet, a sheet feeding cassette selection unit configured to select at least one of the plurality of sheet feeding cassettes, a sheet data selection unit configured to select sheet data about at least one type of print sheet from the registered sheet data, an adjustment value setting unit configured to set adjustment value information during image formation while feeding the selected print sheet from the selected sheet feeding cassette, and a database setting unit configured to set, in association with each other in a sheet database, the attribute of the selected sheet feeding cassette, the selected sheet data about the print sheet, and the set adjustment value information, wherein the database setting unit allows setting to one piece of sheet data among the sheet data about the selected one or more types of print sheets, adjustment value information about each of the one or more sheet feeding cassettes selected by the sheet feeding cassette selection unit.

Further features of the present invention will become apparent from the following description of embodiments with reference to the attached drawings.

BRIEF DESCRIPTION OF THE DRAWINGS

FIGS. 7A and 7B illustrate a data structure of a usable sheet list and a data structure of a sheet template, respectively.

FIGS. 8A and 8B each illustrate a sheet management screen of the sheet management application.

FIG. 9 illustrates a sheet data edit screen of the sheet management application.

FIGS. 17A and 17B illustrate a flowchart of sheet setting processing for each sheet feeding cassette according to a second embodiment and a warning screen to be displayed during sheet setting, respectively.

FIG. 19 illustrates a sheet data creation setting screen of a sheet management application according to a fourth embodiment.

DESCRIPTION OF THE EMBODIMENTS

Figure 1:
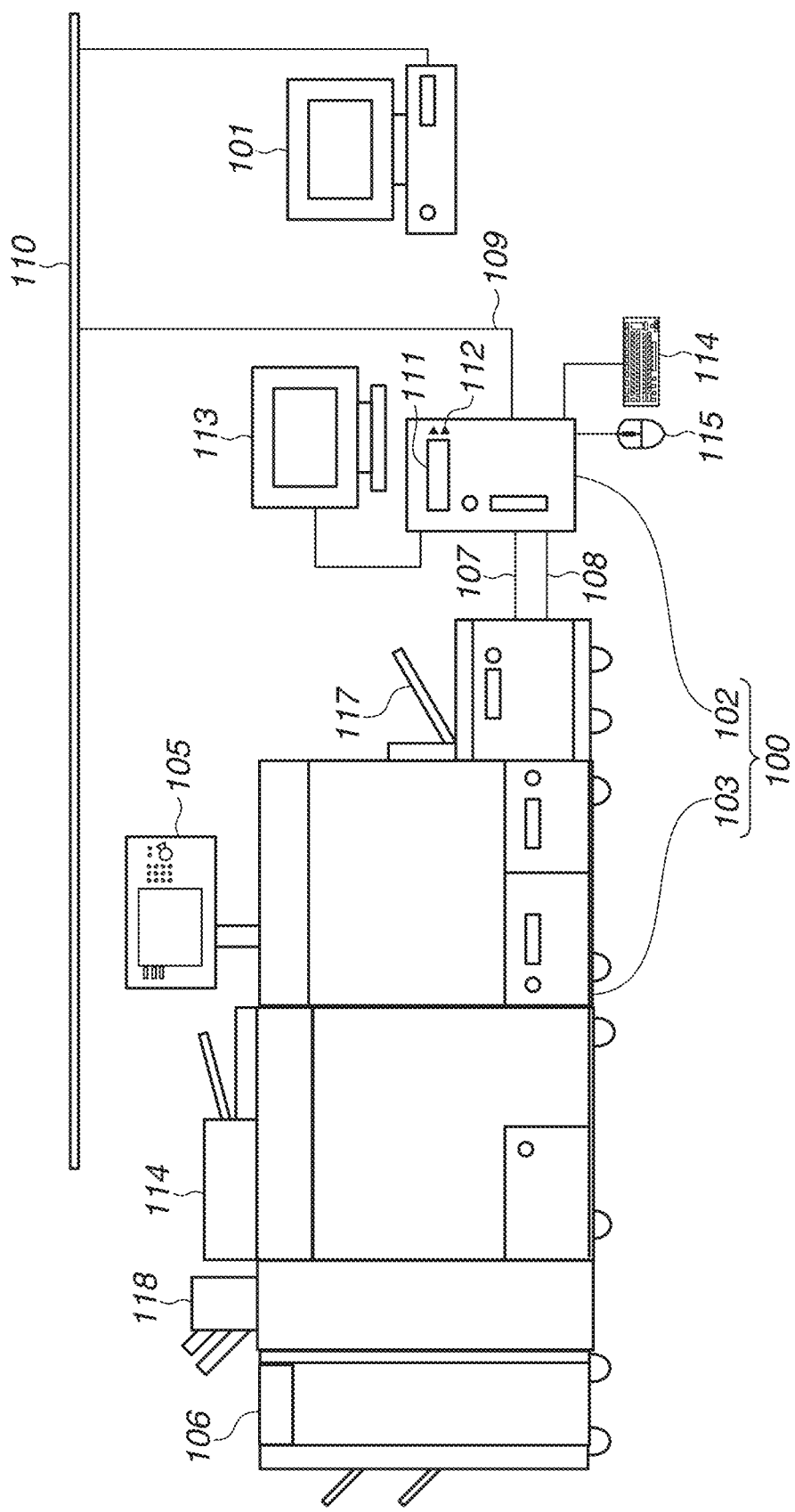
FIG. 1 is a block diagram illustrating an overall configuration example of a print management system according to a first embodiment.

Embodiments for carrying out the present disclosure will be described below with reference to the drawings.

In the following description of embodiments and the accompanying drawings, components having the same function are denoted by the same reference numerals and repeated descriptions thereof are omitted.

A first embodiment will be described below. FIG. 1 is a block diagram illustrating an overall configuration of a print management system 100 according to a first embodiment. The print management system 100 illustrated in FIG. 1 includes an image forming apparatus 103 and a print control apparatus 102. The print management system 100 is communicably connected to a client computer 101. The client computer 101 and the print control apparatus 102 are communicably connected through, for example, an Ethernet® cable 109 via a local area network (LAN) 110. The print control apparatus 102 and the image forming apparatus 103 are connected through, for example, an image video cable 107 and a control cable 108.

In the present embodiment, the image forming apparatus 103 is not directly connected to the LAN 110. The image forming apparatus 103 and the client computer 101 communicate with each other via the print control apparatus 102. The image forming apparatus 103 may be connected to the LAN 110. In other words, the image forming apparatus 103 may be directly connected to the client computer 101 so that the image forming apparatus 103 can communicate with the client computer 101. The client computer 101 activates an application to, for example, send a print instruction to the print management system 100. The print control apparatus 102 performs image processing in cooperation with the image forming apparatus 103.

The image forming apparatus 103 is a multifunction peripheral including various functions. Accordingly, the image forming apparatus 103 is capable of not only processing image data received from the client computer 101 and the print control apparatus 102, but also copying image data read from a scanner unit 104 and transmitting the image data to a shared folder. In a case where the scanner unit 104 scans an image, the scanner unit 104 receives various instructions from a user through various keys on a control panel of an operation unit 105. Various pieces of information such as a scan state, are displayed on the panel of the operation unit 105. A post-processing device 106 receives a print sheet having an image formed thereon (hereinafter referred to as a "sheet"), performs post-processing on the received sheet, and discharges the processed sheet. A paper deck 116, a manual feed tray 117, and an inserter 118, each of which can accommodate long sheets, are provided as sheet feeding devices.

A display unit 111 of the print control apparatus 102 displays information about the print control apparatus 102. An operation button unit 112 of the print control apparatus 102 is operated to perform an operation on the information displayed on the display unit 111. The information displayed on the display unit 111 is used in order to, for example, display minimum required information (a power supply operation, or checking of an IP address) which is used when the print control apparatus 102 is operated. An external display device 113 of the print control apparatus 102 includes a liquid crystal monitor. A keyboard 114 and a pointing device 115 such as a Mouse® are provided as input devices.

The present embodiment illustrates a case where in the print management system 100 the print control apparatus 102 and the image forming apparatus 103 are provided separately. Alternatively, the functions of the print control apparatus 102 may be included in the image forming apparatus 103 without physically providing the separate print control apparatus 102. The display device 113 may also include a position input function such as a touch pad, which can function as the pointing device 115.

Figure 2:
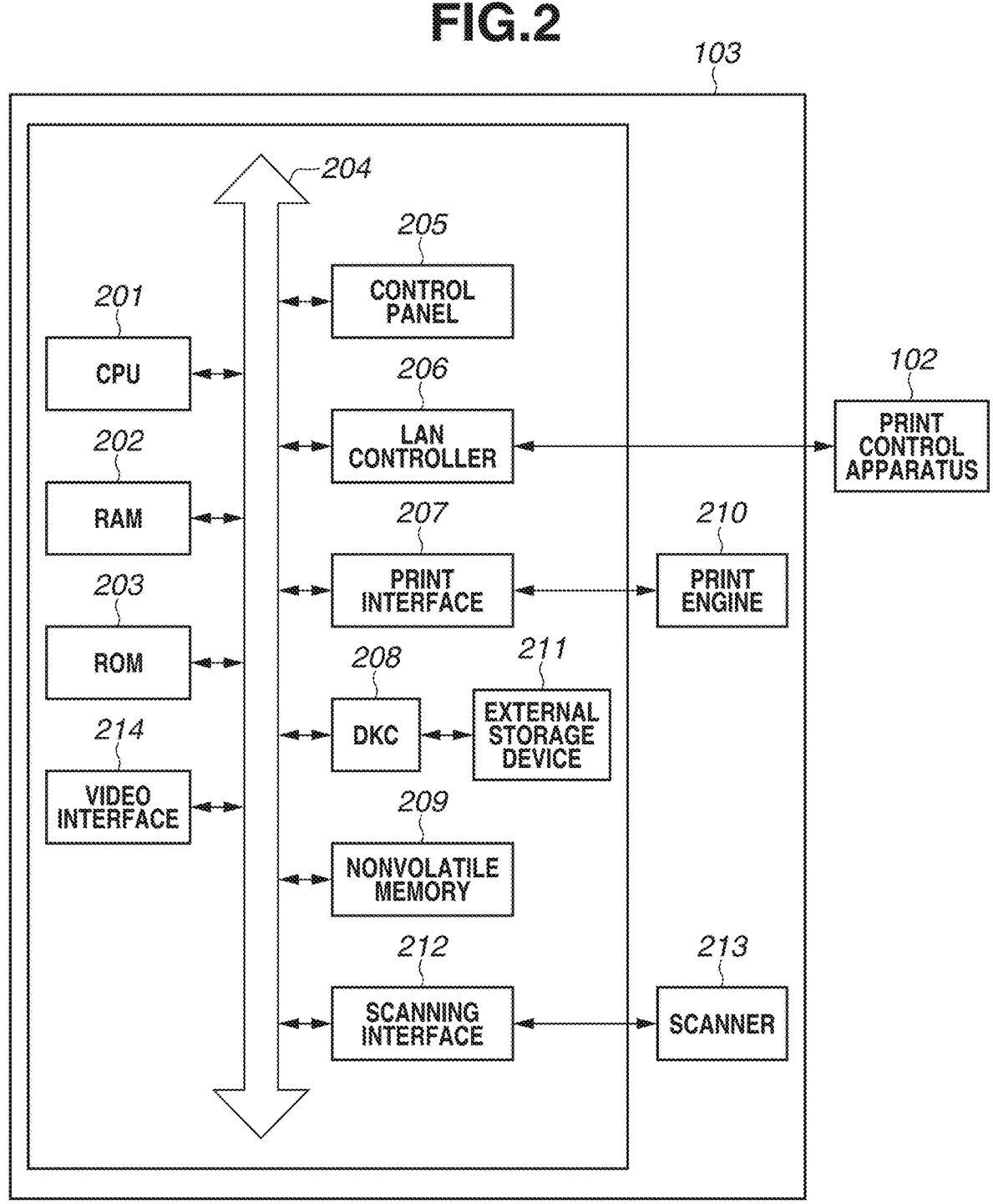
FIG. 2 is a block diagram illustrating a hardware configuration example of an image forming apparatus.

FIG. 2 is a block diagram illustrating a hardware configuration example of the image forming apparatus 103. Referring to FIG. 2, a central processing unit (CPU) 201 controls the overall access to various devices connected to a system bus 204 based on control programs stored in a read only memory (ROM) 203 or an external storage device 211. Further, the CPU 201 outputs an image signal as output information to a print unit (hereinafter referred to as a "print engine") 210, which is connected via a print interface 207, and controls an image signal received from a scanning unit (hereinafter referred to as a "scanner") 213, which is connected via a scanning interface 212. The CPU 201 can perform communication processing with the print control apparatus 102 via a LAN controller 206.

A random access memory (RAM) 202 mainly functions as a main memory, a work area, or the like for the CPU 201. Access to the external storage device 211 such as a hard disk (hereinafter referred to as an "HDD") or an integrated circuit (IC) card, is controlled by a disk controller (DKC) 208. The external storage device 211 is used as a job storage area for storing an application program, font data, form data, and the like. Further, the external storage device 211 temporarily spools a print job (hereinafter referred to as a "job"), and externally controls the spooled job. The external storage device 211 is also used as a BOX data storage area for storing as BOX data, image data read from the scanner 213 and image data about the job, and referring to data of the network, and allows printing.

In the present embodiment, an HDD is used as the external storage device 211, and various logs such as a job log and an image log, are stored. A control panel 205 allows the user to input various pieces of information via a software key or a hardware key. A nonvolatile memory 209 stores various pieces of information set by a terminal via the control panel 205 or the network. A video interface 214 receives image data from the print control apparatus 102.

Figure 3:
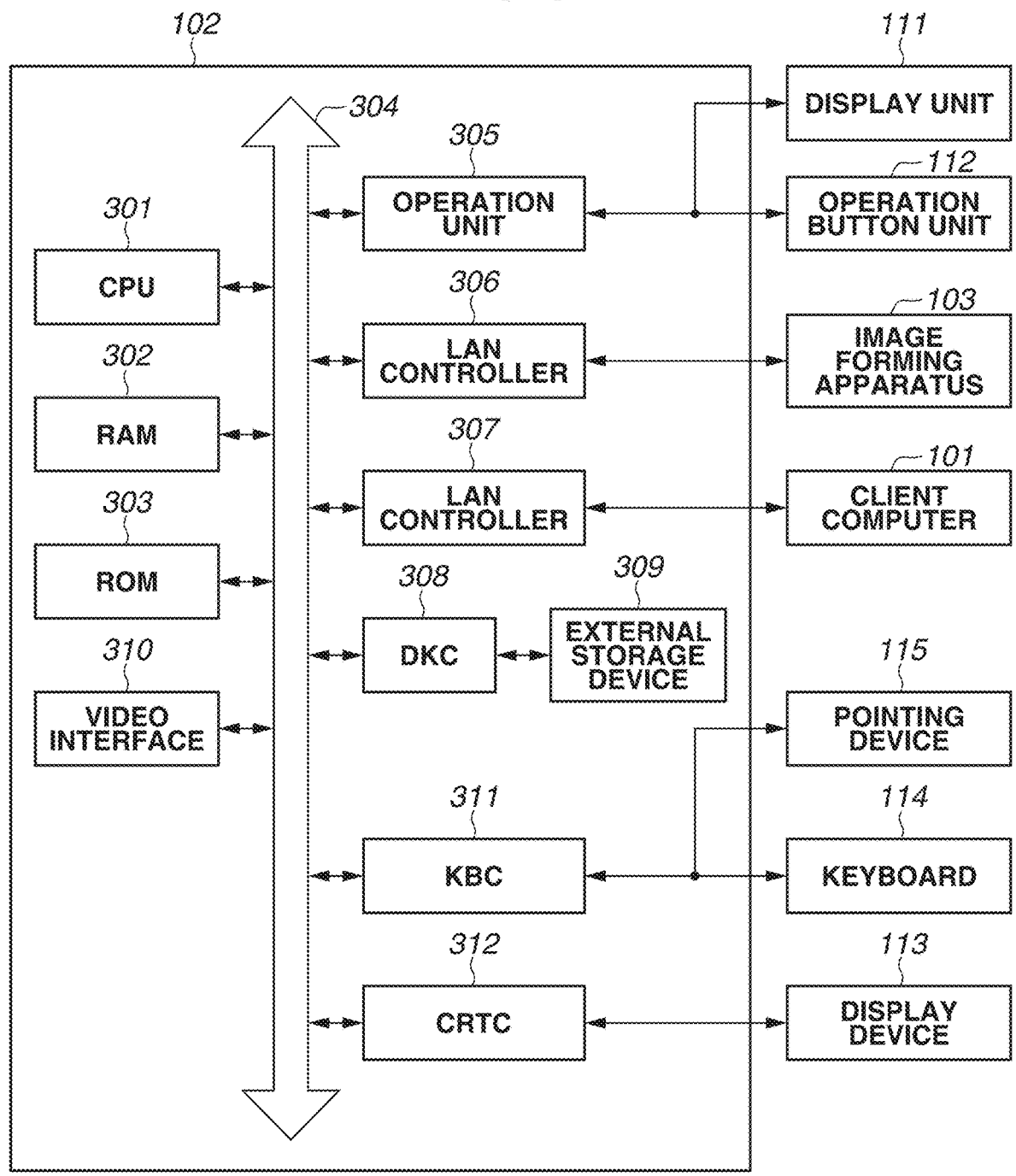
FIG. 3 is a block diagram illustrating a hardware configuration example of a print control apparatus.

FIG. 3 is a block diagram illustrating a hardware configuration example of the print control apparatus 102. Referring to FIG. 3, a CPU 301 controls the overall access to various devices connected to a system bus 304 based on control programs stored in a ROM 303 or an external storage device 309. The CPU 301 can perform communication processing with the image forming apparatus 103 via a LAN controller 306. Further, the CPU 301 can perform communication processing with the client computer 101 on the network and the image forming apparatus 103 via a LAN controller 307. A RAM 302 mainly functions as a main memory, a work area, or the like for the CPU 301.

Access to the external storage device 309 such as a hard disk (HDD) or an IC card, is controlled by a disk controller (DKC) 308. The external storage device 309 is used to store an application program, font data, form data, and the like. The external storage device 309 is also used to temporarily spool a job. The external storage device 309 is also used as a job storage area for storing processed data again when raster image processor (RIP) processing is performed on the spooled job. An operation unit 305 allows the user to receive various pieces of information from the operation button unit 112, and also allows display of the input information on the display unit 111.

A video interface 310 transmits image data subjected to RIP processing to the image forming apparatus 103 via the LAN controller 306. A keyboard controller (KBC) 311 performs processing for inputting information and the like from the keyboard 114, the pointing device 115, and the like. A display control unit (hereinafter referred to as a "CRTC") 312 includes a video memory provided therein. The CRTC 312 renders image data in the video memory according to an instruction from the CPU 301, and outputs the image data rendered in the video memory as a video signal to the display device 113.

Figure 4:
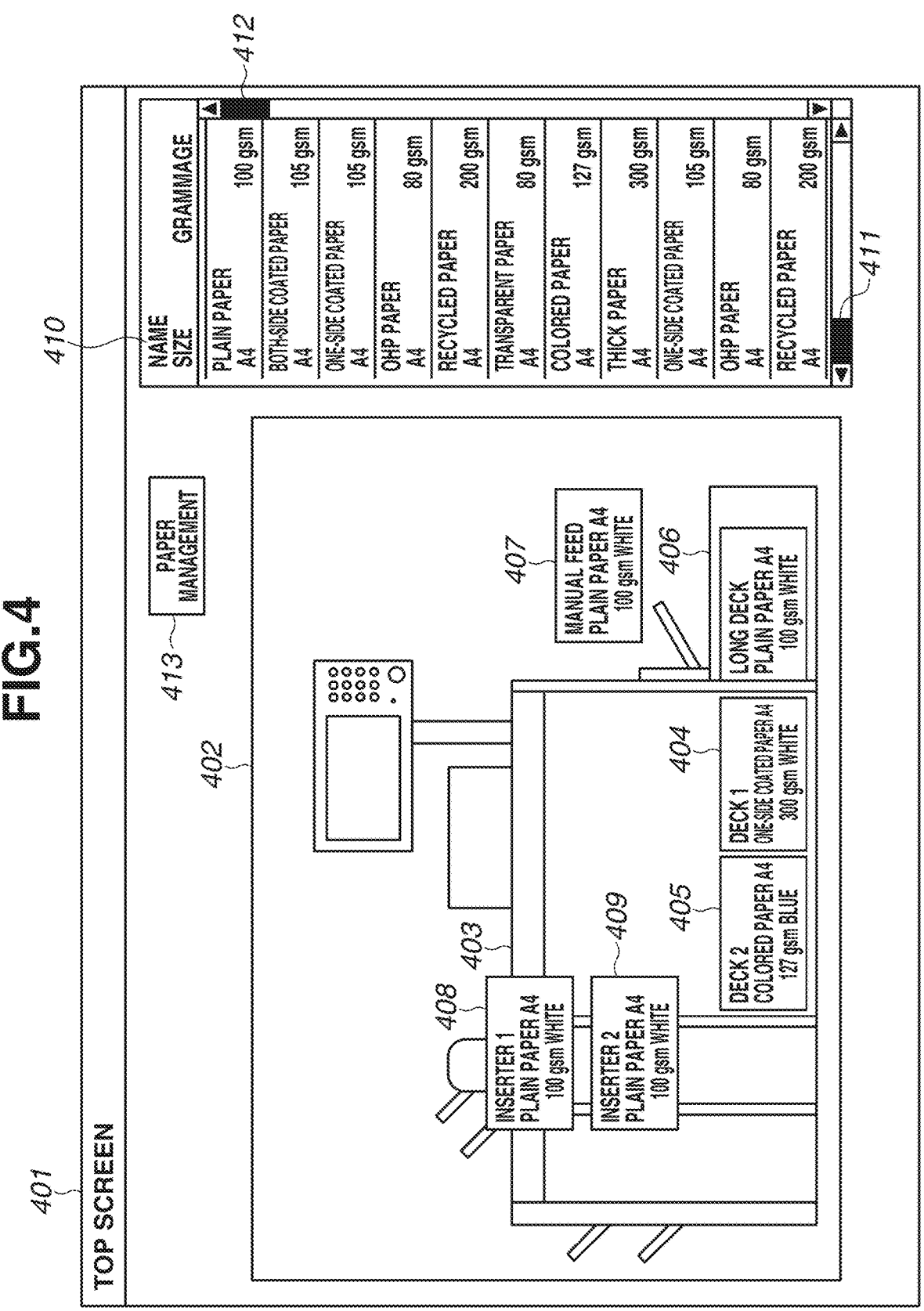
FIG. 4 illustrates an example of a top screen of a sheet management application.

FIG. 4 illustrates a top screen of a sheet management application that runs on the print control apparatus 102. FIG. 4 illustrates a state where a top screen 401 of the sheet management application displays information or the like about each sheet feeding cassette of the image forming apparatus 103. The top screen 401 outputs the image data rendered in the video memory of the CRTC 312 to the display device 113 as a video signal to be displayed according to an instruction from the CPU 301.

A device state display area 402 in the top screen 401 can display information about each sheet feeding cassette of the image forming apparatus 103. An image 403 within the device state display area 402 represents a current connection state of an optional hardware of the image forming apparatus 103 that is connected to the print control apparatus 102. Specifically, when the sheet management application is started, the application acquires optional hardware information about the image forming apparatus 103, and creates and displays an image presenting an accurate connection state according to the option information. In the present embodiment, FIG. 4 illustrates a state where a long deck, a manual feed tray, inserters, and a finisher are connected.

Sheet feeding cassette buttons 404 to 409, i.e., the sheet feeding cassette button 404 for a deck 1, the sheet feeding cassette button 405 for a deck 2, the sheet feeding cassette button 406 for a long deck, the sheet feeding cassette button 407 for a manual feed tray, and the sheet feeding cassette buttons 408 and 409 for inserters, respectively, are arranged in the image 403. The sheet management application creates and arranges the sheet feeding cassette buttons based on information about each sheet feeding cassette of the image forming apparatus 103 that is acquired when the sheet management application is started. An image 410 is an image displaying sheet list for displaying sheet information of a sheet database. Attribute information about each sheet is set in each stage of the sheet list display image 410. In the example of FIG. 4, the name, size, and grammage of each sheet are displayed in each stage as attribute information.

Attribute information other than the displayed sheet attribute information can also be displayed by operating a slider bar 411. Further, sheets other than the displayed sheet types can also be displayed by operating a slider bar 412. A sheet management button 413 is used to display a screen for managing sheets in a sheet list.

Figure 5:
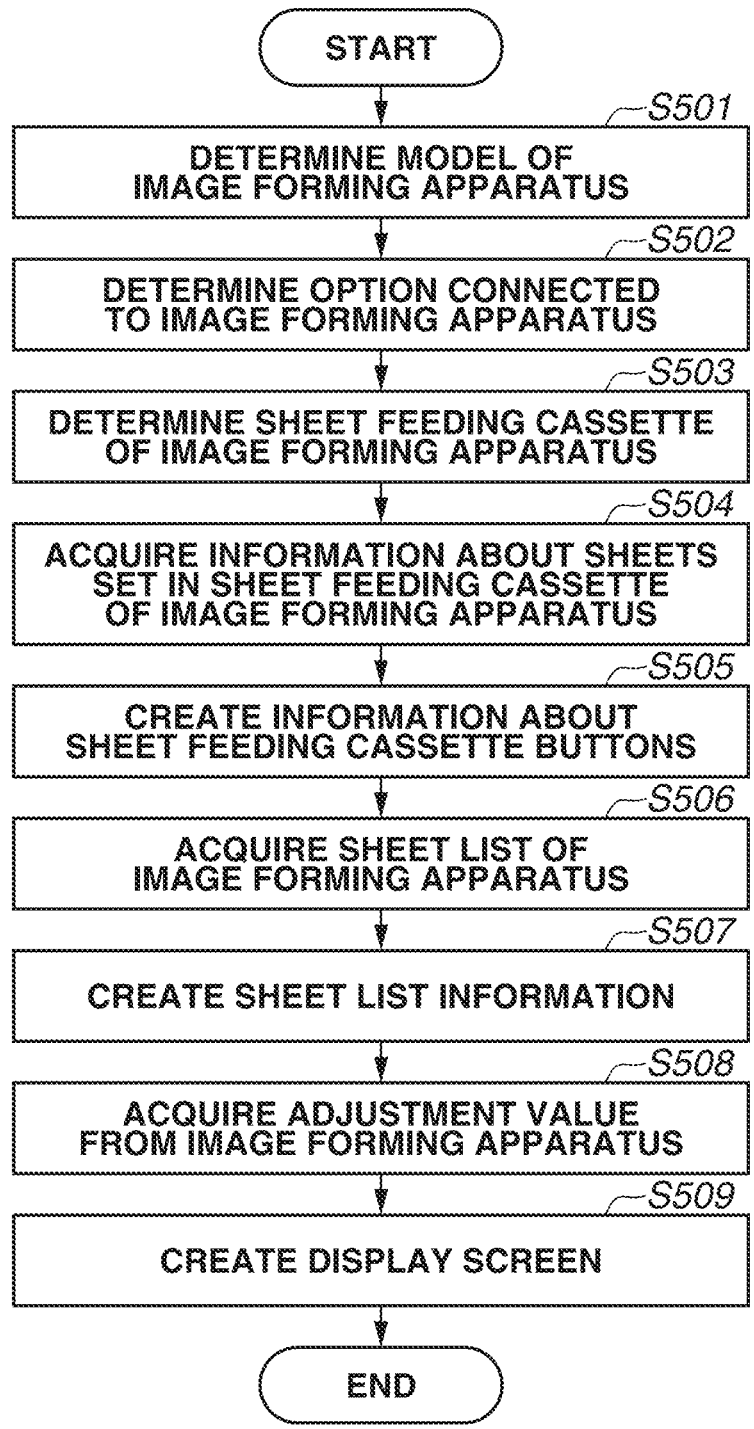
FIG. 5 is a flowchart illustrating processing to be performed to start up the sheet management application.

FIG. 5 is a flowchart illustrating processing for creating the top screen 401 when the sheet management application is started on the print control apparatus 102. Programs that runs on the print control apparatus 102 according to the flowchart illustrated in FIG. 5 are stored in, for example, the external storage device 309 illustrated in FIG. 3, and are loaded into the RAM 302 and executed by the CPU 301. In the following description, a reference symbol "S" denotes a step.

When the sheet management application is started, in step S501, the sheet management application determines a model of the image forming apparatus 103, which is a sheet management target. The sheet management application determines the model of the image forming apparatus 103, and uses the determination result in creating the optional hardware image 403, or absorbing a difference in specifications of each model. In this case, the sheet management application communicates with the image forming apparatus 103 and acquires model information from information returned from the image forming apparatus 103 in step S607 in start-up processing of the image forming apparatus 103 to be described below. The sheet management application determines the model of the image forming apparatus 103 based on the acquired model information and model determination information which is preliminarily held by the sheet management application.

Next, in step S502, the sheet management application communicates with the image forming apparatus 103 and acquires information about a hardware option connected to the image forming apparatus 103 from information returned from the image forming apparatus 103 in step S609 to be described below. Based on the information, the sheet management application determines the hardware option connected to the image forming apparatus 103. The sheet management application uses information about the determined hardware option in creating the optional hardware image 403, identifying information about each sheet feeding cassette, or absorbing a difference in specifications of each model.

In step S503, the sheet management application communicates with the image forming apparatus 103 in step S611 described below, and acquires sheet feeding cassette information about the image forming apparatus 103. The sheet feeding cassette information includes information about sheet feeding cassette structures such as a paper deck, a manual feed tray, and a long deck. Further, the sheet management application determines the sheet feeding cassettes connected to the image forming apparatus 103, which is subjected to sheet management, and identifies the number of connected sheet feeding cassettes.

Next, in step S504, the sheet management application communicates with the image forming apparatus 103 and acquires information about sheets set in the sheet feeding cassettes from information returned from the image forming apparatus 103 in step S611 described below.

Next, in step S505, the sheet management application creates information about the sheet feeding cassette buttons 404 to 409 to be displayed on the optional hardware image 403.

In step S506, the sheet management application communicates with the image forming apparatus 103 and acquires sheet list information returned from the image forming apparatus 103 in step S613 described below.

After that, in step S507, the sheet management application creates information about a sheet list to be displayed on the top screen 401.

In step S508, the sheet management application communicates with the image forming apparatus 103 and acquires adjustment values corresponding to adjustment items from information that is returned from the image forming apparatus 103 in step S615 described below. The adjustment values are used when a sheet management screen and a sheet data edit screen, which are described below, are created.

Next, in step S509, the top screen 401 is created based on the model of the image forming apparatus 103 acquired in step S501, the hardware option information acquired in step S502, the sheet feeding cassette button information created in step S505, and the sheet list information created in step S507.

The flowchart of FIG. 5 is described as an operation to be performed when the sheet management application is started. However, there is a possibility that the sheet feeding cassette information, the sheet list information, and the adjustment values for the image forming apparatus 103 may be changed, as needed, when the sheet management application is used. Accordingly, the communication between the sheet management application and the image forming apparatus 103 and updating of each information in association with the communication are also carried out, as needed, regardless whether the sheet management application or the image forming apparatus 103 performs the operation. In addition, information is to be synchronized between the sheet management application and the image forming apparatus 103.

Figure 6:
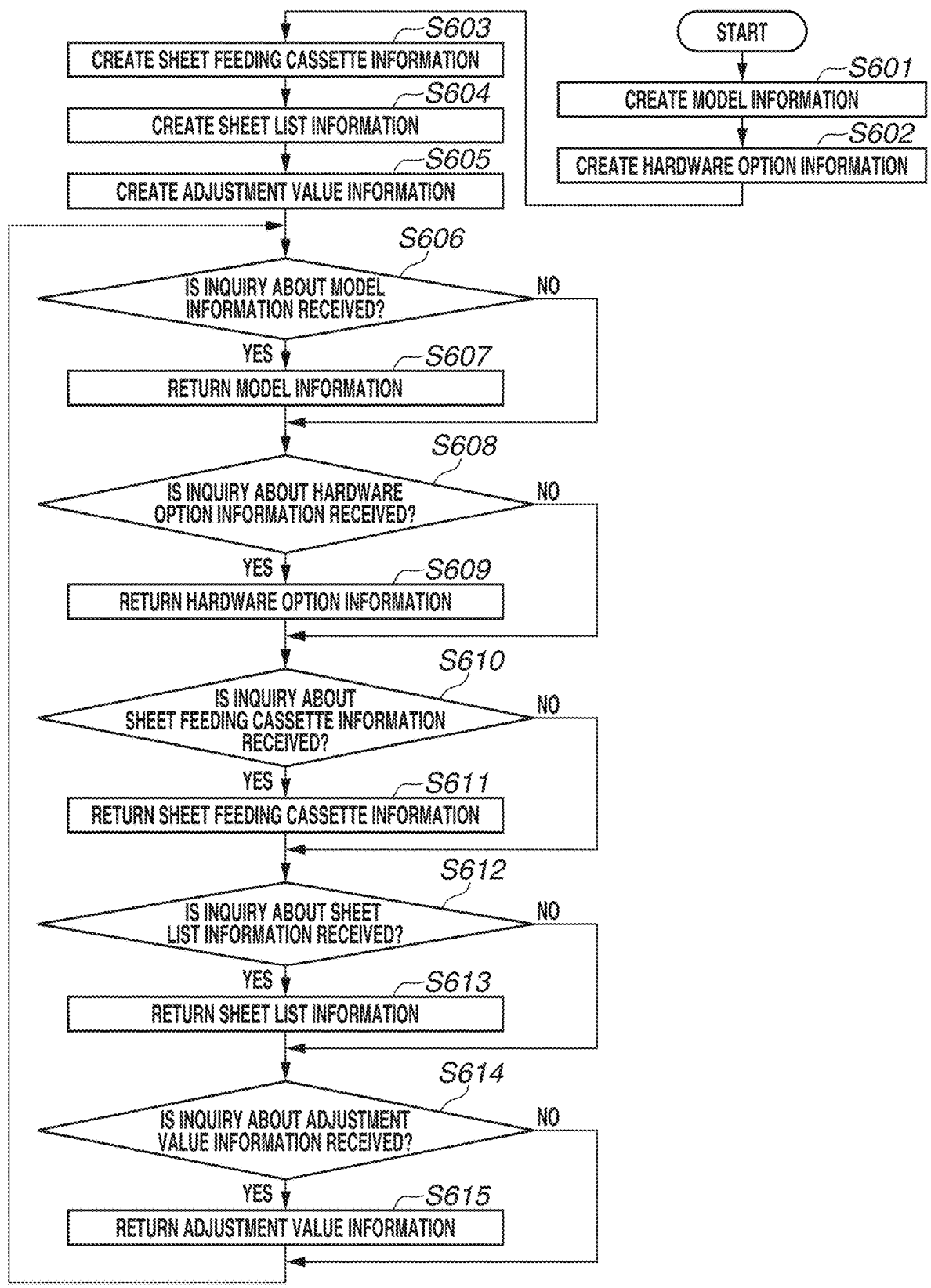
FIG. 6 is a flowchart illustrating processing to be performed to start up the image forming apparatus.

FIG. 6 is a flowchart illustrating start-up processing of the image forming apparatus 103. Programs that run on the image forming apparatus 103 according to the flowchart illustrated in FIG. 6 are stored in, for example, the external storage device 211 illustrated in FIG. 2, and are loaded into the RAM 202 and executed by the CPU 201.

When the image forming apparatus 103 is started, in step S601, the image forming apparatus 103 acquires model information about the image forming apparatus 103 from, for example, the external storage device 211, and creates data that can be returned.

Next, in step S602, the image forming apparatus 103 acquires information about an optional hardware connected to the image forming apparatus 103 and information about sheets set in each sheet feeding cassette from, for example, the external storage device 211, and creates data that can be returned.

Next, in step S603, the image forming apparatus 103 acquires information about the sheet feeding cassettes of the image forming apparatus 103 from, for example, the external storage device 211, and creates data that can be returned.

Next, in step S604, the image forming apparatus 103 acquires sheet list information about the image forming apparatus 103 from the external storage device 211 and creates data that can be returned.

In step S605, the image forming apparatus 103 acquires information about adjustment values for the respective sheets from, for example, the external storage device 211 and creates data that can be returned. The adjustment values are acquired for all adjustment items that can be carried out by the image forming apparatus 103. The image forming apparatus 103 stores the sheet list information and the adjustment value information about each sheet in, for example, the sheet database of the external storage device 211. In step S606, the image forming apparatus 103 determines whether an inquiry about the model information is received from the print control apparatus 102. If the inquiry about the model information created in the sheet management application start-up processing of step S501 is received (YES in step S606), the processing proceeds to step S607 to return the model information created in step S601, and then the processing proceeds to step S608. If the inquiry about the model information is not received (NO in step S606), the processing also proceeds to step S608.

In step S608, the image forming apparatus 103 determines whether an inquiry about the hardware information is received from the print control apparatus 102. If the inquiry about the optional hardware information obtained in step S502 described above is received (YES in step S608), the processing proceeds to step S609 to return the optional hardware information created in S602 to the print control apparatus 102, and then the processing proceeds to step S610. If the inquiry about the optional hardware information is not received (NO in step S608), the processing also proceeds to S610.

In step S610, the image forming apparatus 103 determines whether an inquiry about the sheet feeding cassette information or the like is received from the print control apparatus 102. If the inquiry about the sheet feeding cassette information or the like obtained in steps S503 and S504 is received (YES in step S610), the processing proceeds to step S611 and the image forming apparatus 103 returns the sheet feeding cassette information or the like created in step S603 to the print control apparatus 102, and then the processing proceeds to step S612. If the inquiry about the sheet feeding cassette information or the like is not received (NO in step S610), the processing also proceeds to step S612.

In step S612, the image forming apparatus 103 determines whether an inquiry about the sheet list information is received from the print control apparatus 102. If the inquiry about the adjustment value information obtained in step S506 described above is received (YES in step S612), the processing proceeds to step S613 and the image forming apparatus 103 returns the sheet feeding cassette information created in step S604 to the sheet management application, and then the processing proceeds to step S614. If the inquiry about the sheet list information is not received (NO in step S612), the processing also proceeds to step S614.

In step S614, the image forming apparatus 103 determines whether an inquiry about adjustment value information is received from the print control apparatus 102. If the inquiry about the adjustment value information obtained in step S508 described above is received (YES in step S614), the processing proceeds to step S615 and the image forming apparatus 103 returns the adjustment value information created in step S605 to the print control apparatus 102, and then the processing proceeds to step S606. If the inquiry about the sheet feeding cassette information is not received (NO in step S614), the processing also proceeds to step S606.

The information received from the image forming apparatus 103 are stored in, for example, the RAM 302 of the print control apparatus 102.

A sheet feeding deck according to the present embodiment is only an example of a sheet feeding unit. The sheet feeding unit may include other mechanisms. The configuration of the sheet feeding unit is not particularly limited.

A data structure of a usable sheet list and a data structure of a sheet template which are used in the sheet management application will be described with reference to FIGS. 7A and 7B. The sheet management application stores the sheet list information and the adjustment value information, which are acquired in steps S506 and S508, in the external storage device 309, for example, as the usable sheet list and the sheet template data in the data structures illustrated in FIGS. 7A and 7B, respectively.

FIG. 7A illustrates a data structure of the usable sheet list that can be allocated to the sheet feeding cassettes. An ID 701 is uniquely provided for each sheet type of usable sheets to distinguish the sheets from each other. Items 702 to 717 each represent an attribute name or an adjustment name of sheet data. As the usable sheet name (item 702), for example, a name within 63 characters can be set to each sheet. The grammage 703 represents a weight per unit area of each sheet. The size 704 represents the size of each sheet. A regular size, such as an A3 or letter size, and any custom size can be set as the size 704. The surface property 705 represents the surface property of each sheet such as high-quality paper, coated paper, recycled paper, or a film. The form 706 represents a form of each sheet, such as index paper, punched paper, or label paper, in addition to normal sheets. The color 707 represents color of each sheet.

The usable sheet feeding cassette 708 represents the attribute of each sheet feeding cassette to which usable sheets can be allocated. In a default setting, "none specified" is set, and sheets can be allocated to any usable sheet feeding cassettes. The usable sheet feeding cassette attribute is used by the sheet management application to perform sheet adjustment or sheet allocation. The usable sheet feeding cassette attribute is an attribute that does not belong to the image forming apparatus 103. The duplex-printing second side 709 is an item indicating whether a sheet printed once by the image forming apparatus 103 is to be loaded in the same sheet feeding cassette to perform duplicate printing on the sheet. In the present case, "1" is set to the sheet on which duplicate printing is performed.

The item 710 represents a leading edge image position adjustment value. The item 711 represents a left edge image position adjustment value. The item 712 represents a curl correction adjustment value. The item 713 represents a saddle fold adjustment value for adjustment of a fold position in saddle stitch printing. The item 714 represents a creep correction amount adjustment value for correction of a shift in saddle stitch printing. The item 715 represents a secondary transfer voltage adjustment value. The item 716 represents a bias adjustment value for secondary transfer static elimination. The item 717 represents a primary transfer voltage adjustment value. Rows 718 to 720 represent data on usable sheets of IDs 001 to 003, respectively.

FIG. 7B illustrates a data structure of a sheet template. The sheet template data differs from the usable sheet data in that the items of the size 704 and the usable sheet feeding cassette 708 are omitted.

<Addition and Edit of Sheet Data on Usable Sheet List>

Processing in which the sheet management application creates usable sheet data, adds the created usable sheet data to the usable sheet list, and edits the usable sheet list, will be described with reference to FIGS. 8A to 11. Programs that run on the print control apparatus 102 according to the processing are stored in, for example, the external storage device 309 illustrated in FIG. 3, and are loaded into the RAM 302 and executed by the CPU 301.

When the sheet management button 413 is touched by, for example, the pointing device 115 on the top screen 401 illustrated in FIG. 4, the sheet management application displays the sheet management screen. In the following description, the description of an operation using the pointing device 115 or the like when the application is operated, such as touching a button by the user, is omitted. Naturally, such an operation is carried out using an input device. When the display device 113 includes a position input function such as a touch pad, the user can directly touch the screen of the display device 113 to perform an operation.

FIG. 8A illustrates a sheet management screen 801 to be displayed when the sheet management button 413 is touched on the top screen 401 illustrated in FIG. 4. The sheet management screen 801 is a screen to be displayed when image data rendered in the video memory of the CRTC 312 according to an instruction from the CPU 301 is output and displayed on the display device 113 as a video signal. The sheet management screen 801 is displayed on, for example, a front surface of the top screen 401.

The sheet management screen 801 includes a usable sheet list 802, a create new button 803 for creating sheet data so that sheets can be used in the print system, and an edit button 804 for editing existing sheet data. The sheet management screen 801 also includes a button 805 for copying sheet data of the usable sheet list illustrated in FIG. 7, or a sheet template to be described below, a button 806 for deleting selected sheet data, a button 807 for closing the sheet management screen, and a button 815 for displaying a sheet template list.

The sheet management screen 801 also includes an item row 808 for displaying a sheet name, an attribute name such as a size and a surface property, and an adjustment name, a slider bar 809 for displaying a sheet attribute and an adjustment value, and a slider bar 810 for displaying sheets other than the displayed sheet types. Items 811 to 814 are examples of usable sheet data. In the example of FIG. 8A, sheet data with a sheet name "thick paper" indicated by the item 811 is selected.

When the "TO SHEET TEMPLATE" button 815 is touched, the sheet management application displays the sheet management screen 801 illustrated in FIG. 8B. In a sheet template list 816 in the sheet management screen 801, sheet template data 817, 818, 819, and 820 illustrated in FIG. 7B are displayed. Since the sheet template attribute cannot be edited, the sheet management application grays out the edit button 804. When a "TO USABLE SHEET LIST" button 821 is touched, the sheet management application returns the sheet management screen to the display of the usable sheet list 802 illustrated in FIG. 8A.

A sheet data edit screen which is opened when the create new button 803 or the sheet data edit button 804 is touched will be described with reference to FIG. 9. A sheet data edit screen 901 is a screen to be displayed when image data rendered in the video memory of the CRTC 312 according to an instruction from the CPU 301 is output and displayed on the display device 113 as a video signal. The sheet data edit screen 901 is displayed on, for example, a front surface of the sheet management screen 801.

The sheet data edit screen 901 includes a sheet information area 902 for displaying a sheet name and a sheet attribute. The sheet information area 902 includes a display area 903 for displaying sheet adjustment items. The sheet data edit screen 901 also includes a save button 904 for saving sheet data in the sheet database, a cancel button 905, and a close button 906 for closing the sheet data edit screen. The sheet data edit screen 901 also includes a checkbox 907 which is marked when sheet data for a plurality of sheet feeding cassettes is simultaneously created, and a setting button 908 for creating sheet data for a plurality of sheet feeding cassettes simultaneously.

The sheet data edit screen 901 also includes a text box 909 for inputting and correcting the name of sheet data, and text boxes or pull-down menus 910 to 915 for inputting and correcting sheet attributes. The sheet data edit screen 901 also includes a usable sheet feeding cassette pull-down menu 916 for specifying a sheet feeding cassette using sheet data to be created or edited, and buttons 917 to 924 for setting sheet adjustment values for image position adjustment, curl correction, and the like. A current setting state is displayed on each button.

When the create new button 803 is touched on the sheet management screen 801, the sheet management application displays the sheet data edit screen 901 illustrated in FIG. 9. The sheet data edit screen 901 displays, for example, a state where the sheet name "new sheet" is set, the same attribute as "plain paper 80" in the sheet template 818 is set as the sheet data attribute such as grammage and a surface property, and all adjustment values are set to initial values. In this state, the user sets new sheet information by using a text box, a pull-down menu, or a button within the sheet information area 902.

After that, when the save button 904 is touched, the sheet management application saves the set new sheet information as usable sheet data. Specifically, for example, a new ID 004 is set as the ID 701 in the usable sheet data illustrated in FIG. 7A, and the sheet information and adjustment values set in the sheet information area 902 are added as usable sheet data to the items 702 to 717 in a corresponding row 721.

When the usable sheet list is displayed as illustrated in FIG. 8A and the edit button 804 is touched, the sheet management application displays the sheet information in the sheet data of the selected usable sheet on the sheet data edit screen 901. In this state, the sheet information is edited using a text box, a pull-down menu, or a button within the sheet information area 902. After that, when the save button 904 is touched, the sheet management application overwrites and saves the edited sheet information as usable sheet data. As a result, the corresponding sheet information and adjustment values in the usable sheet data illustrated in FIG. 7A are updated with the edited data.

When the copy button 805 is touched in the state illustrated in FIG. 8A, the sheet management application sets and displays the sheet information about the sheet attribute and adjustment value in the selected usable sheet data, on the sheet data edit screen 901. In this case, the sheet name is, for example, "a copy (of the name of the selected sheet)".

For example, when the copy button 805 is touched in the state illustrated in FIG. 8B, "thin paper 64" is selected and thus a sheet name "a copy of thin paper 64" is set. In this case, since the sheet data in the sheet template does not include size information, the sheet management application checks whether size information is present. If size information is not input, the sheet management application issues a warning. In response to the warning, the user uses the pull-down menu in the sheet information area 902 to input the size of the selected sheet.

When the save button 904 is touched, the sheet management application sets and saves the set sheet information in the usable sheet list illustrated in FIG. 7A.

Next, processing to be performed when usable sheet data is created simultaneously for a plurality of sheet feeding cassettes will be described.

Figure 10:
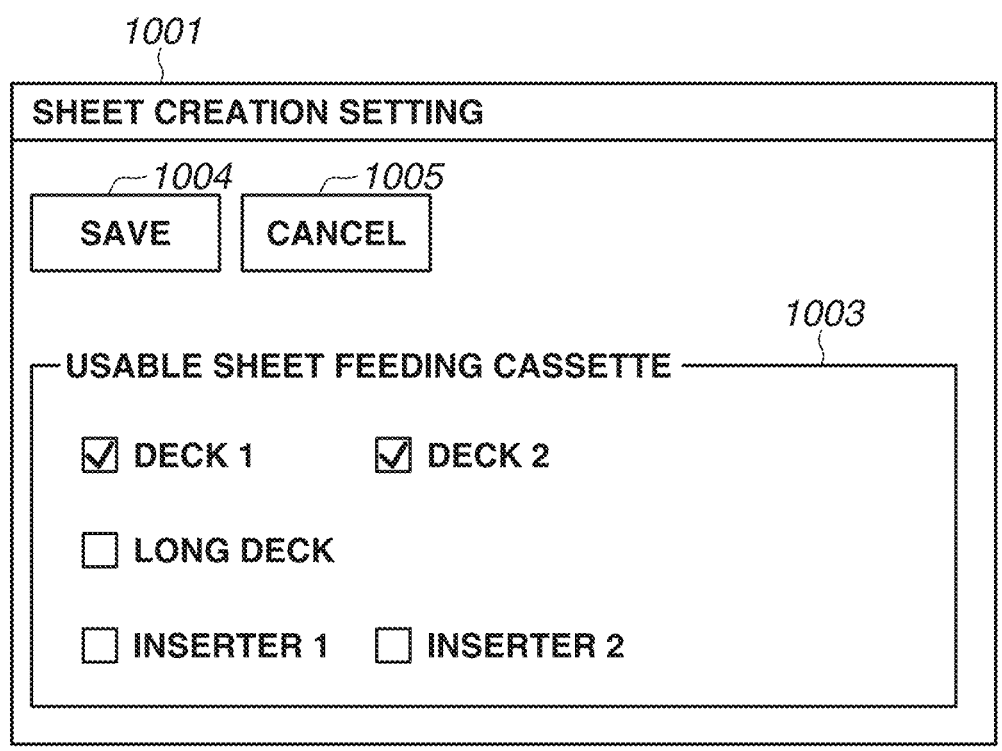
FIG. 10 illustrates a sheet data creation setting screen of the sheet management application.

FIG. 10 illustrates an example of a sheet data creation setting screen 1001. The sheet data creation setting screen 1001 is a screen to be opened when the user touches the "setting" button 908 on the sheet data edit screen 901 illustrated in FIG. 9 in a case where sheet data is created simultaneously for a plurality of sheet feeding cassettes. A usable sheet feeding cassette setting area 1003 within the sheet data creation setting screen 1001 is used to make a setting to create sheet data for a plurality of usable sheet feeding cassettes. The sheet data creation setting screen 1001 also includes a save button 1004 and a cancel button 1005.

The usable sheet feeding cassette setting area 1003 is provided with checkboxes corresponding to the configurations of sheet feeding cassettes of the image forming apparatus 103. When the user marks a checkbox, usable sheet data about the corresponding usable sheet feeding cassette is created in the following manner.

In the usable sheet feeding cassette setting area 1003, sheet feeding cassette checkboxes respectively corresponding to the sheet feeding cassettes of the image forming apparatus 103 are displayed. Assume herein that the user marks, for example, checkboxes corresponding to decks 1 and 2, respectively, among the sheet feeding cassettes provided in the image forming apparatus 103. When the checkboxes are marked, the checkbox 907 on the sheet data edit screen 901 may be marked.

Processing for creating usable sheet data based on the sheet data creation setting will be described with reference to FIG. 10 and a flowchart illustrated in FIG. 11. Programs that run on the print control apparatus 102 according to the flowchart are stored in, for example, the external storage device 309 illustrated in FIG. 3, and are loaded into the RAM 302 and executed by the CPU 301.

First, as described above, assume that checkboxes are marked in the usable sheet feeding cassette setting area 1003 within the sheet data creation setting screen 1001, which is opened when the user touches the "setting" button 908.

If the save button 904 is touched by the user after setting the sheet information on the sheet data edit screen 901 (YES in step S1100), the sheet management application checks the state of the checkbox 907 in step S1101 to create sheet data on a plurality of sheet feeding cassettes. If the checkbox 907 is marked (YES in step S1101), the processing proceeds to step S1103. If the checkbox 907 is not marked (NO in step S1101), the processing proceeds to step S1102.

In step S1102, the sheet management application saves the sheet information set on the sheet data edit screen 901 in the sheet database as usable sheet data, and then closes the sheet data edit screen 901 to terminate the usable sheet data creation processing.

When the checkbox 907 is marked, in step S1103, the sheet management application opens the sheet data creation setting screen 1001 illustrated in FIG. 10. When the user checks the usable sheet feeding cassette setting area 1003 and touches the save button 1004, the sheet management application temporarily closes the sheet data creation setting screen 1001 and sets new sheet data as usable sheet data.

Specifically, for example, the new ID 004 is set as the ID 701 in the usable sheet list illustrated in FIG. 7A, and the sheet information and adjustment values set in the sheet information area 902 illustrated in FIG. 9 are set in the items 702 to 707 and 709 and 717 of the corresponding row 721.

In step S1104, the sheet management application sets to the usable sheet feeding cassette attribute 708 in the row 721 illustrated in FIG. 7A, the sheet feeding cassette which is checked in the usable sheet feeding cassette setting area 1003 and set in the usable sheet feeding cassette pull-down menu 916, in the present case "deck 1". When the user touches the save button 904 in step S1100, the usable sheet feeding cassette attribute in the usable sheet feeding cassette pull-down menu 916 is displayed on the sheet data edit screen 901, so that the user already checks the usable sheet feeding cassette attribute together with other attributes.

In step S1105, the sheet management application sets a name obtained by adding the name of the sheet feeding cassette, to the name of the sheet data set as the sheet information name (item 702). For example, when the sheet name is "thick paper 157" and the usable sheet feeding cassette is "deck 1", "thick paper 157_deck 1" is set as the sheet data name (text box 909) in the sheet information area 902.

In step S1105, the name of the sheet feeding cassette is added to the name of the sheet data so that the usable sheet feeding cassette can be determined from the name. However, since the usable sheet data is managed using the ID 701, the setting of the name in step S1105 is not essential.

In step S1106, when the save button 904 is touched, the sheet management application adds and saves the sheet information set on the sheet data edit screen 901 as usable sheet data.

In step S1107, the sheet management application checks whether there is any sheet feeding cassette for which sheet data is not created among the sheet feeding cassettes checked in the usable sheet feeding cassette setting area 1003. If there is no sheet feeding cassette for which sheet data is not created (NO in step S1107), the sheet data edit screen 901 is closed to terminate the usable sheet data creation processing.

If there is a sheet feeding cassette for which sheet data is not created (YES in step S1107), the processing returns to step S1104 to perform the processing of steps S1104 to S1107 on the next sheet feeding cassette in the same manner as described above.

In this case, since sheet data is not created for the checked "deck 2", the sheet management application performs the processing of steps S1104 to S1107. Specifically, "deck 2" is displayed as the usable sheet feeding cassette attribute in the usable sheet feeding cassette pull-down menu 916, and sets, for example, a new ID 005 as the ID 701 in the usable sheet list illustrated in FIG. 7A.

Next, the sheet information and adjustment values set in the sheet information area 902 illustrated in FIG. 9 are set as usable sheet data in the items 702 to 707 and 709 to 717 in the corresponding row 722. Further, "deck 2" is set as the usable sheet feeding cassette attribute 708 in the row 722, and, for example, "thick paper 157_deck 2" is set as the sheet data name (text box 909) in the sheet information area 902. Lastly, when the save button 904 is touched, the sheet information set on the sheet data edit screen 901 is added and saved as usable sheet data.

The sheet information and adjustment value corresponding to the new ID 004 in the row 721 are the same as the sheet information and adjustment value corresponding to the ID 005 of the row 722 in the usable sheet data illustrated in FIG. 7A. Therefore, the common new ID 004 may be set to the same row and both "deck 1" and "deck 2" may be described in the usable sheet feeding cassette attribute 708.

The present embodiment illustrates a case where the same sheet information and adjustment value are set to a plurality of sheet feeding cassettes simultaneously. However, different sheet information and adjustment values may be set to a plurality of sheet feeding cassettes set in the usable sheet feeding cassette setting area 1003. In that case, the user may change and set the attribute and adjustment value in the sheet information area 902 before touching the save button 904 in step S1106.

<Setting of Sheet Adjustment Value Information Based on Usable Sheet Feeding Cassette Attributes>

When sheet adjustment value information is set based on, for example, attributes of usable sheet feeding cassettes, processing to be performed will be described with reference to FIG. 13 and a flowchart illustrated in FIG. 12. Programs that run on the print control apparatus 102 according to the flowchart are stored in, for example, the external storage device 309 illustrated in FIG. 3, and are loaded into the RAM 302 and executed by the CPU 301.

When the user selects usable sheet data, e.g., sheet data with the sheet name "thick paper" indicated by the item 811, in the usable sheet list 802 illustrated in FIG. 8A, and then touches the edit button 804, the sheet management application opens the sheet data edit screen 901 illustrated in FIG. 9.

A case where an image position adjustment is carried out is herein described as an example of the sheet adjustment item. However, a curl correction adjustment and the like are also carried out in the same manner as the image position adjustment.

When the user touches the image position adjustment button 917, in step S1201, the sheet management application acquires sheet information in the selected usable sheet data from the usable sheet list 802.

Next, in step S1202, the sheet management application checks whether the usable sheet feeding cassette attribute indicates "none specified". If the usable sheet feeding cassette attribute indicates "none specified" (YES in step S1202), the processing proceeds to step S1205. In other cases, the processing proceeds to step S1203. Since the usable sheet feeding cassette attribute in the selected sheet data 811 indicates "none specified" in this case, the processing proceeds to step S1205.

In step S1203, the sheet management application checks whether the sheet corresponding to the usable sheet data is set to the sheet feeding cassette specified in the usable sheet data. If the sheet is set (YES in step S1203), the processing proceeds to step S1208. If the sheet is not set (NO in step S1203), the processing proceeds to step S1204.

In step S1204, the sheet management application allocates the sheet corresponding to the usable sheet data to the specified sheet feeding cassette. Specifically, the sheet management application transmits an instruction for setting the sheet in the specified sheet feeding cassette, an ID of usable sheet data to be set, and information about specific sheet feeding cassette, to the image forming apparatus 103 through the control cable 108.

The CPU 201 of the image forming apparatus 103 sets sheet information about the usable sheet of the received ID to the sheet feeding cassette specified by the print engine 210 through the print interface 207 based on the received information. Further, the CPU 201 reflects the result in its own sheet database and transmits the result to the print control apparatus 102, and the sheet management application reflects the result in the sheet feeding cassette information. After completion of step S1204, the processing proceeds to step S1208.

Figure 13:
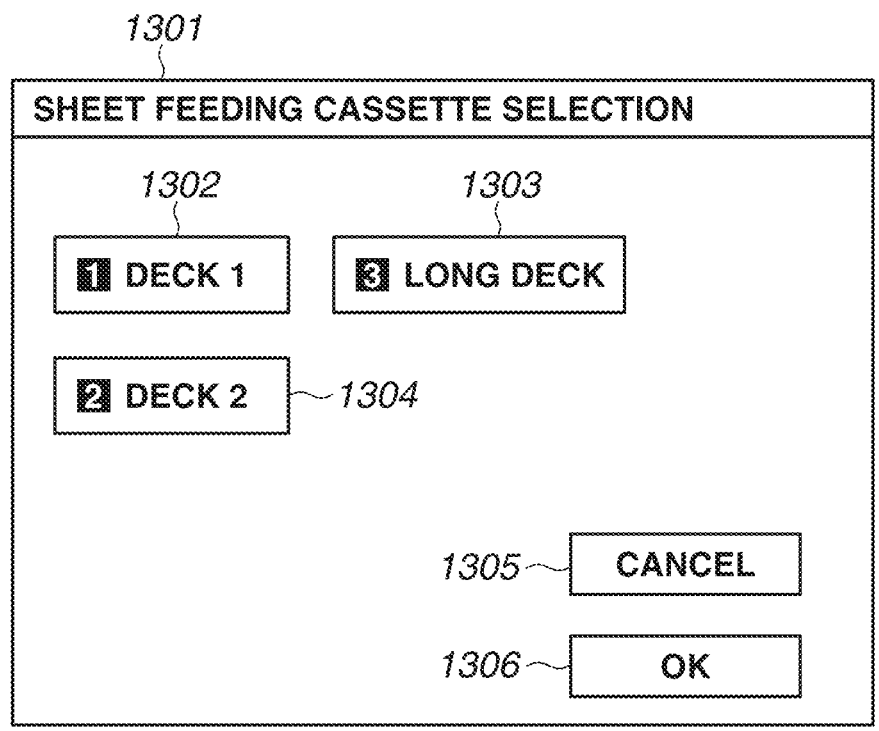
FIG. 13 illustrates a sheet feeding cassette selection screen of the sheet management application.

In step S1205, the sheet management application displays a sheet feeding cassette selection screen 1301 illustrated in FIG. 13. The sheet feeding cassette selection screen 1301 includes sheet feeding cassette buttons 1302 to 1304 each indicating a sheet feeding cassette of the image forming apparatus 103, a cancel button 1305, and an OK button 1306 for entering the setting. In step S1206, the sheet management application waits for the user to set the sheet feeding cassette using the sheet feeding cassette buttons. If the sheet feeding cassette is set (YES in step S1206), the processing proceeds to step S1207. If the sheet feeding cassette is not set (NO in step S1206), the processing returns to step S1205.

In step S1207, like in step S1204, the sheet management application transmits, to the image forming apparatus 103, an instruction for allocating the sheet corresponding to the usable sheet data to the sheet feeding cassette set on the sheet feeding cassette selection screen 1301. After completion of step S1207, the processing proceeds to step S1208.

In the state where the sheet is set in the usable sheet feeding cassette as described above, in step S1208, the sheet management application performs an image position adjustment using a sheet adjustment screen (an image position adjustment screen in this case) as described below.

<Image Position Adjustment by Sheet Management Application>

The image position adjustment processing of step S1208 will be described in detail as an example of the sheet adjustment item.

First, an outline of the image position adjustment processing will be described with reference to FIG. 14.

Figure 14:
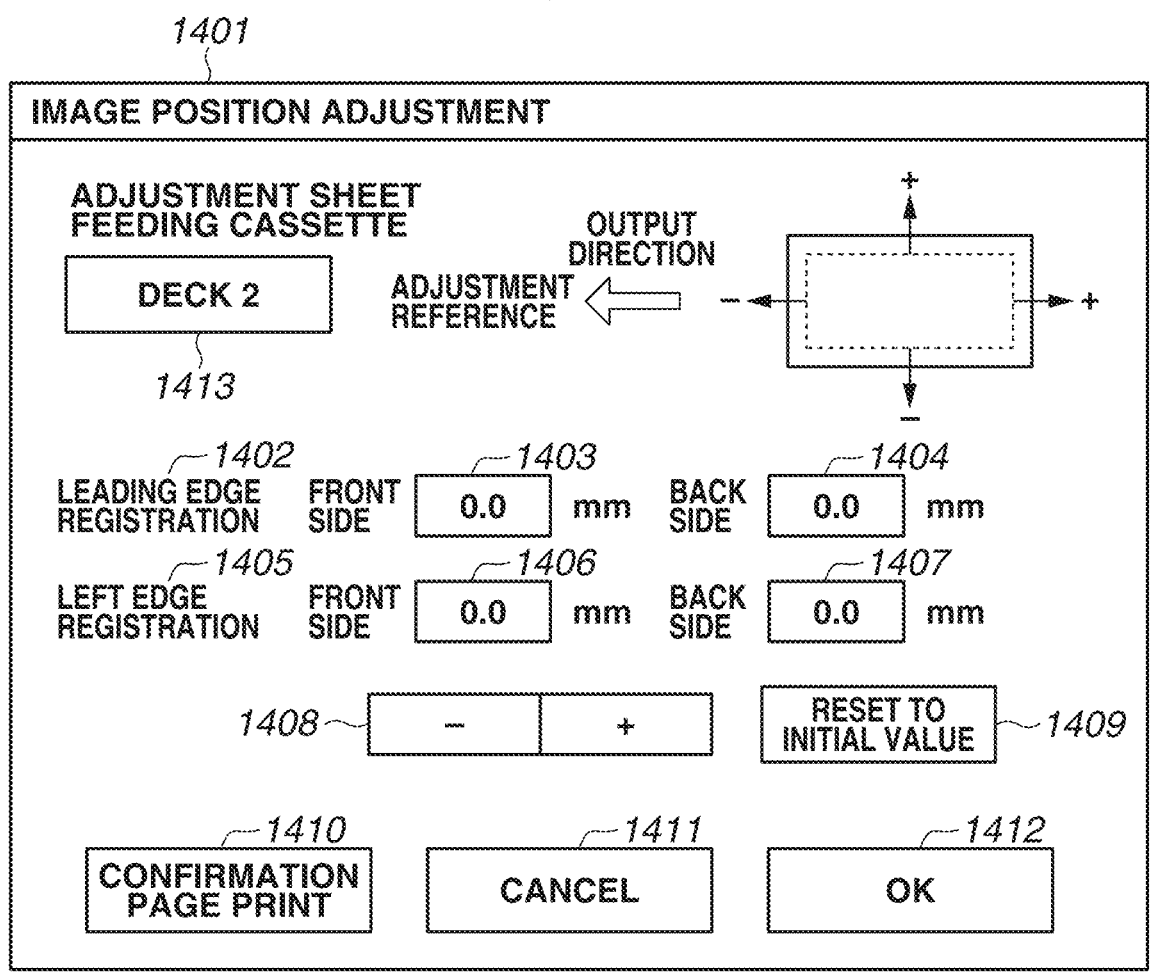
FIG. 14 illustrates an image position adjustment screen of the sheet management application.

When the button 917 for image position adjustment is touched on the sheet data edit screen 901 illustrated in FIG. 9, an image position adjustment screen 1401 illustrated in FIG. 14 is displayed. FIG. 14 illustrates an example where "deck 2" is selected as the adjustment target sheet feeding cassette.

A value for adjusting a shift in the vertical direction or the horizontal direction of an image to be printed on a print sheet is determined by a user's input on the image position adjustment screen 1401.

The image position adjustment screen 1401 will be described below. An item 1402 is used for adjustment of a leading edge registration position. Adjustment values for a front side and a back side are displayed in fields 1403 and 1404, respectively. An item 1405 is used for adjustment of a left edge registration position. Adjustment values for a front side and a back side are displayed in fields 1406 and 1407, respectively. Adjustment values are input by a button 1408. In a state where the user selects any item (field) corresponding to a predetermined adjustment, the CRTC 312 changes the value of the selected item by +0.1 mm or −0.1 mm every time the "+" button or "−" button 1408 is touched. The value of the selected item may be directly input from the keyboard 114 or the like.

When a "RESET TO INITIAL VALUE" button 1409 is touched, values in adjustment value fields 1403, 1404, 1406, and 1407 are reset. When a cancel button 1411 is touched, the image position adjustment screen 1401 is closed to return the screen to the sheet data edit screen 901.

When an OK button 1412 is touched, the input values in the adjustment value fields 1403, 1404, 1406, and 1407 are saved as adjustment values for sheet data to be adjusted in the usable sheet list 802.

Figure 15:
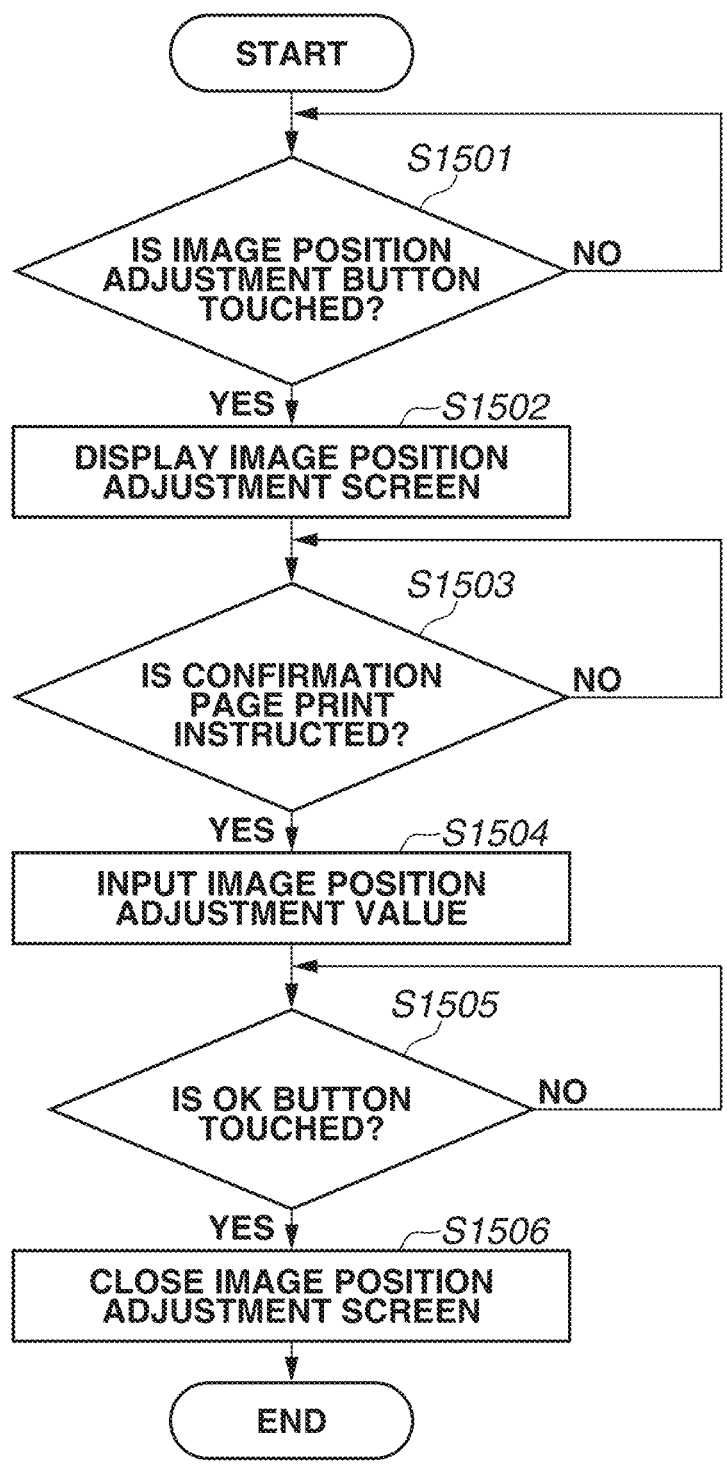
FIG. 15 is a flowchart illustrating image position adjustment processing according to the first embodiment.

Next, a specific method for image position adjustment using the image position adjustment screen 1401 will be described with reference to FIG. 14 and a flowchart illustrated in FIG. 15. Programs that run on the print control apparatus 102 according to the flowchart are stored in, for example, the external storage device 309 illustrated in FIG. 3, and are loaded into the RAM 302 and executed by the CPU 301.

First, if the button 917 for image position adjustment is touched in the sheet data edit screen 901 (YES in step S1501), in step S1502, the sheet management application displays the image position adjustment screen 1401 illustrated in FIG. 14. The present embodiment illustrates an example where "deck 2" is selected as a sheet feeding cassette from pull-down menu 916 for the usable sheet feeding cassette in the sheet data edit screen 901, and thus "deck 2" is displayed as an adjustment target sheet feeding cassette in a field 1413 for adjustment target sheet feeding cassette.

When the user touches a confirmation page print button 1410 on the image position adjustment screen 1401 (YES in step S1503), the sheet management application sends an instruction for printing a confirmation page for image position adjustment to the image forming apparatus 103. The image forming apparatus 103 prints the confirmation page for position adjustment by using the specified sheet from the selected sheet feeding cassette (deck 2 in this case).

An adjustment value is determined by the user using the confirmation page output from the image forming apparatus 103 as a reference. In step S1504, the determined adjustment value is input on the image position adjustment screen 1401 by the user. After that, when the user touches the OK button 1412 (YES in step S1505), in step S1506, the sheet management application closes the image position adjustment screen 1401 to return the screen to the sheet data edit screen 901.

The sheet management application reflects the values input into the adjustment value fields 1403, 1404, 1406, and 1407, in the usable sheet list 802 and the usable sheet list illustrated in FIG. 7A as described above. Further, the print control apparatus 102 notifies the image forming apparatus 103 of the set adjustment values, and the adjustment values are reflected in the adjustment value information in the sheet database within the external storage device 211.

Figure 11:
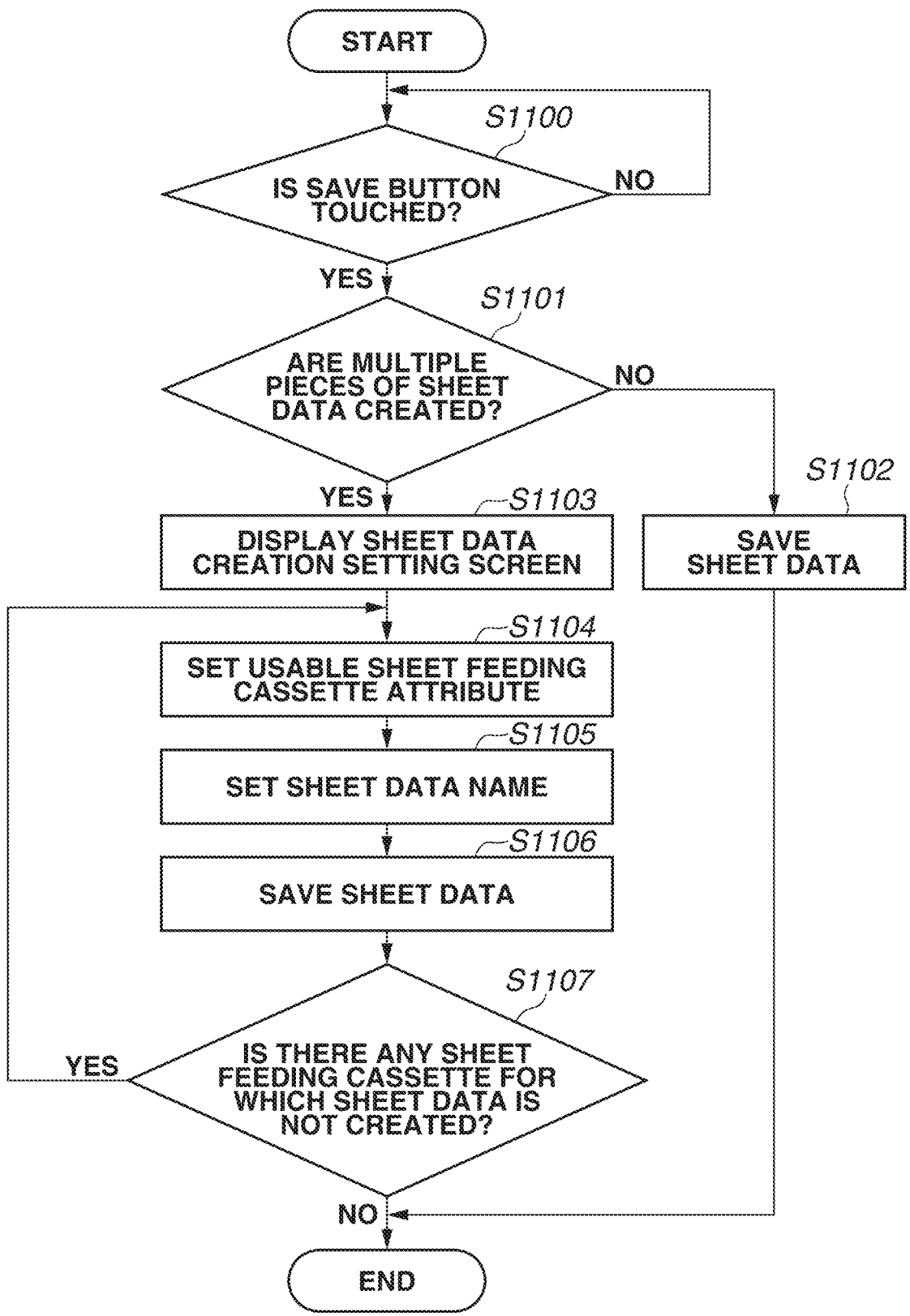
FIG. 11 is a flowchart illustrating sheet data creation processing according to a first embodiment.

The processing described above with reference to FIGS. 12 to 15 can be incorporated in the sheet data setting processing for each sheet feeding cassette in FIG. 11. Specifically, the processing may be executed in the sheet information setting processing prior to step S1100 and in the processing between steps S1105 and S1106. Consequently, the adjustment value information about each of a plurality of usable sheet feeding cassettes for the same sheet type can be collectively set by performing a simple operation.

The image position adjustment based on the image position adjustment value set as described above is executed by the CPU 201 of the image forming apparatus 103. Specifically, the CPU 201 performs the image position adjustment on print data to be printed according to an instruction from the user based on the adjustment value information saved in the sheet database. The CPU 201 executes positional shift correction processing using adjustment values for image position adjustment from the sheet adjustment value information in the sheet data set to the sheet feeding cassette corresponding to the printing target.

As a correction for adjusting position, a method of adjusting an image data rendering position based on a correction value is generally employed when print data is processed by the print engine 210 of the image forming apparatus 103. A method adjusts control timing for each device (not illustrated) in the print engine 210 of the image forming apparatus 103 based on the correction value.

<Sheet Setting to Sheet Feeding Cassettes by Sheet Management Application>

Sheet setting processing in the sheet feeding cassettes of the print control apparatus 102 according to the present embodiment will be described with reference to a flowchart illustrated in FIG. 16A.

Figure 12:
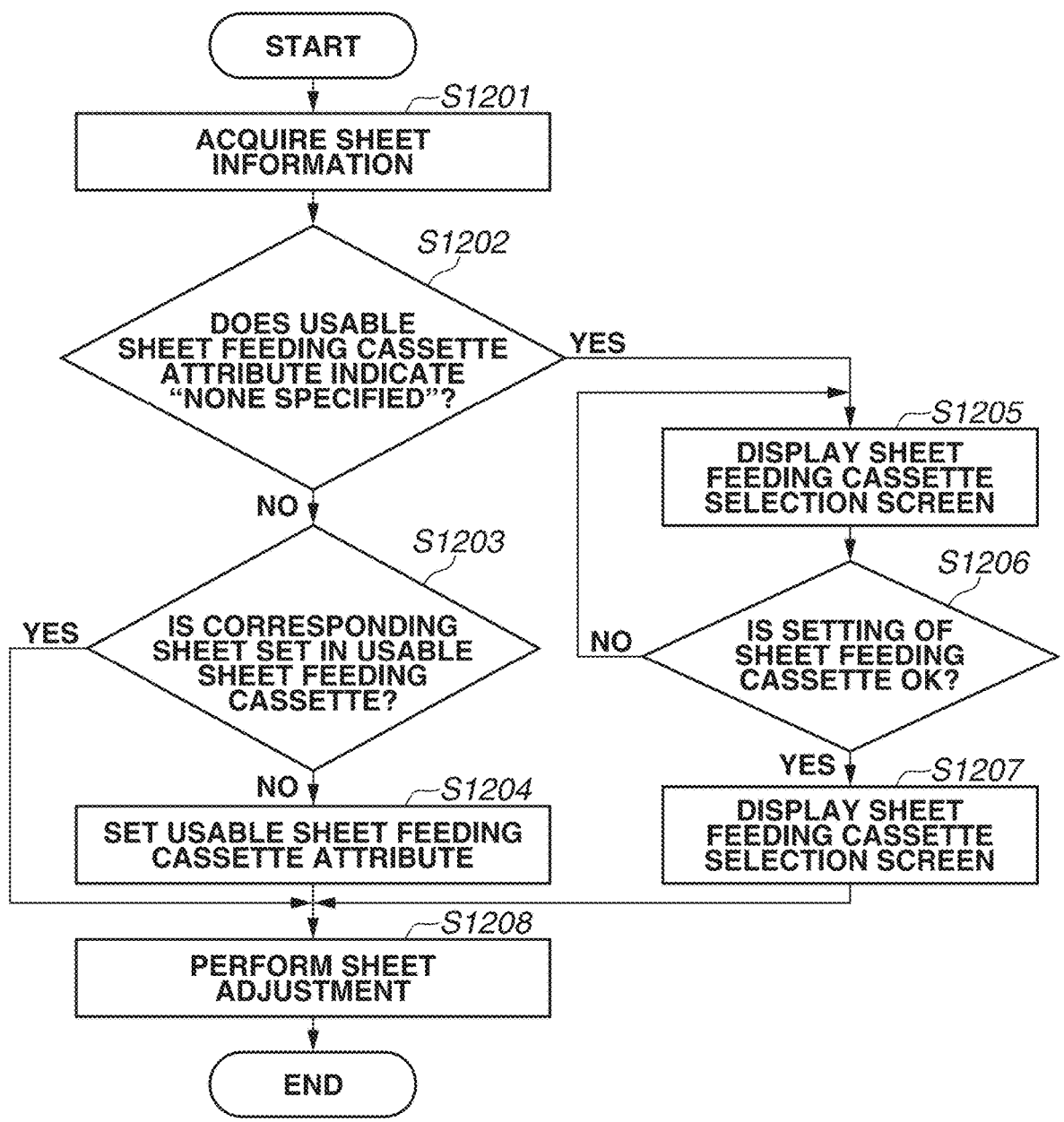
FIG. 12 is a flowchart illustrating processing for setting usable sheet feeding cassette according to the first embodiment.

This sheet setting processing may be executed in, for example, the processing of allocating the sheet corresponding to the usable sheet data, to the specified sheet feeding cassette in steps S1204 and S1207 illustrated in FIG. 12.

Programs that run on the print control apparatus 102 according to the flowchart are stored in, for example, the external storage device 309 illustrated in FIG. 3, and are loaded into the RAM 302 and executed by the CPU 301.

There are various methods for setting a sheet in a sheet feeding cassette using the sheet management application, such as a method of selecting a sheet on a sheet feeding cassette screen (not illustrated), changing a setting, and specifying an adjustment value, and a method of selecting a sheet feeding cassette to be set, from the sheet data edit screen 901. However, in order to set a sheet in a sheet feeding cassette, sheet information to be set and sheet feeding cassette information to be set are commonly required for these sheet setting methods, and the processing to be performed by the sheet management application is common to these sheet setting methods.

Figure 16A:
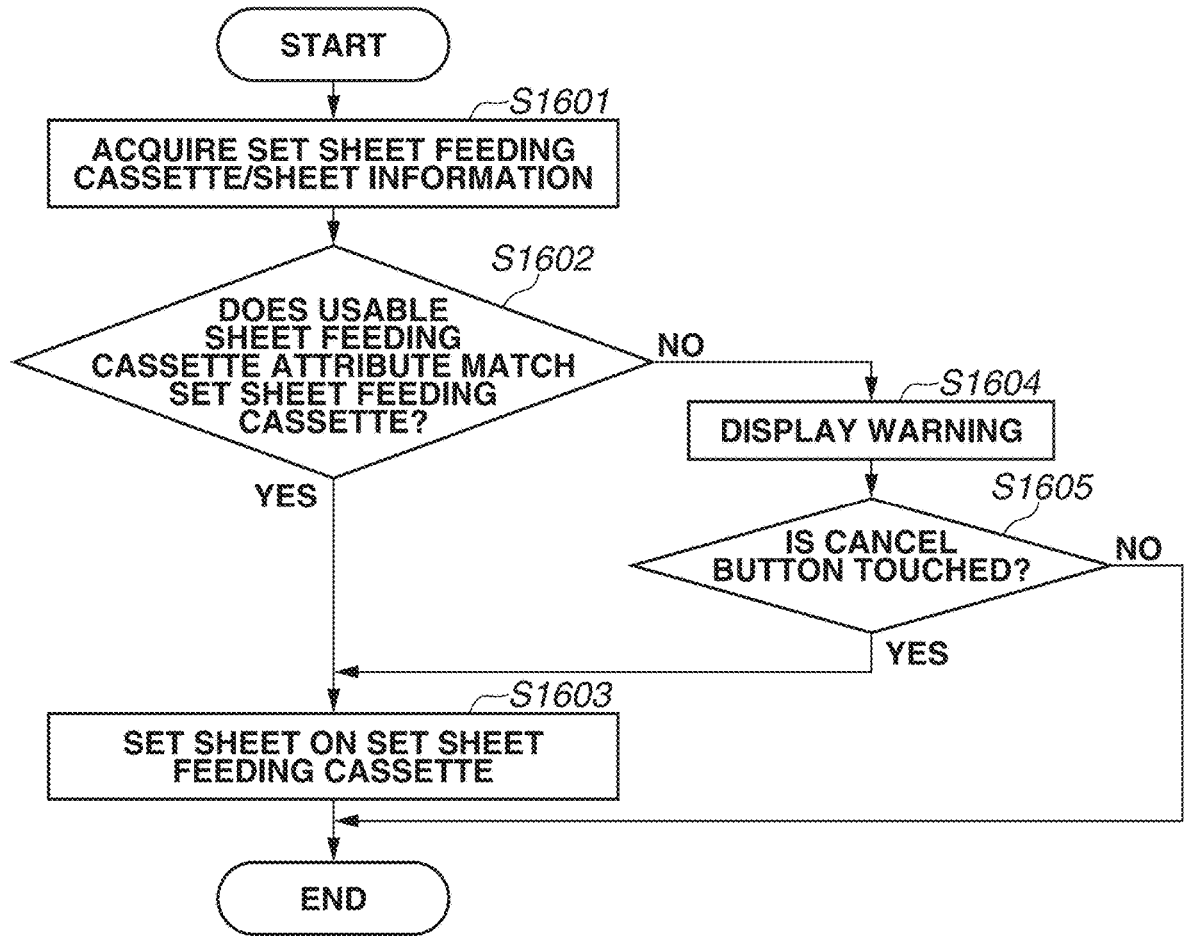
FIGS. 16A and 16B illustrate a flowchart of sheet setting processing for each sheet feeding cassette according to the first embodiment and a warning screen to be displayed during sheet setting, respectively.

Referring to FIG. 16A, first, in step S1601, the sheet management application acquires, for example, sheet data information from the usable sheet list illustrated in FIG. 7A with respect to the sheet selected from the usable sheet list 802 illustrated in FIG. 8A. In step S1602, the sheet management application checks the usable sheet feeding cassette attribute in the acquired sheet data information and the sheet feeding cassette to which the sheet data is set. If the usable sheet feeding cassette attribute matches the sheet feeding cassette to be set (YES in step S1602), the processing proceeds to step S1603. If the usable sheet feeding cassette attribute is different from the sheet feeding cassette to be set (NO in step S1602), the processing proceeds to step S1604. In step S1603, the sheet management application sets the sheet data to the sheet feeding cassette to be set and then terminates the sheet setting processing.

Figure 16B:
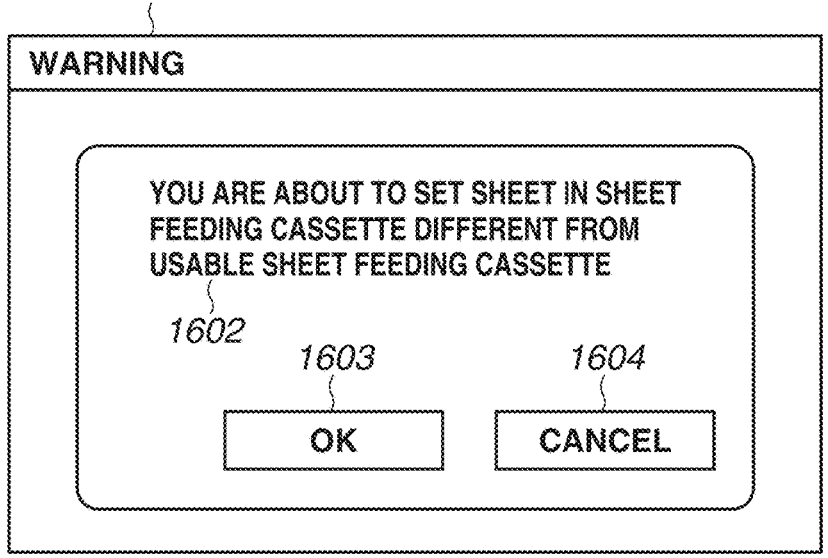

On the other hand, in step S1604, the sheet management application displays a screen for issuing a warning that the usable sheet feeding cassette in the sheet data information acquired in step S1602 is different from the sheet feeding cassette to be set. FIG. 16B illustrates an example of the warning screen. FIG. 16B illustrates a warning screen 1601, a warning message 1602, an OK button 1603, and a cancel button 1604. In step S1605, if the OK button 1603 is touched (YES in step S1605), the processing proceeds to step S1603. If the cancel button 1604 is touched (NO in step S1605), the sheet setting is cancelled. When the OK button 1603 is touched, in step S1603, the sheet setting is carried out upon recognition of the warning.

As the warning, an audio message may be issued instead of displaying a warning message, or the audio message may be issued together with a warning message. The same applies to the following embodiments.

As described above, according to the present embodiment, when sheet data is created from the sheet management application, a plurality of sheet feeding cassettes can be specified for each sheet type, and the sheet feeding cassettes specified during creation of sheet data are held as usable sheet feeding cassette information for each sheet. Further, adjustment values for sheet attributes in each sheet data can be set for each sheet feeding cassette, and sheet feeding cassette information corresponding to the adjustment values for each sheet data is provided as sheet data. In other words, an attribute of selected sheet feeding cassettes, sheet data about a selected printed sheet, and adjustment value information set to a combination of the attribute and the sheet data are associated with each other and set to the sheet database. Consequently, printing can be performed on each sheet type by using sheet data to which accurate adjustment values are applied for each sheet feeding cassette and by using accurate adjustment values for each sheet feeding cassette.

According to the present embodiment, the adjustment value information about usable sheet feeding cassettes for the same sheet type can be collectively set with a simple operation, and thus the setting processing can be more efficiently performed.

Further, according to the present embodiment, a warning is issued when the usable sheet feeding cassette attribute indicated by the sheet data about the selected sheet type is different from the attribute of the sheet feeding cassette to be set. Accordingly, it is possible to avoid printing with an unfavorable quality based on an incorrect adjustment value or the like due to setting of an inappropriate sheet feeding cassette for the selected sheet type.

A second embodiment will be described below. In the first embodiment, in the case of setting sheet data to each sheet feeding cassette, a warning is displayed when the usable sheet feeding cassette attribute is different from the sheet feeding cassette of the sheet setting target. Also in this case, the sheet data about the sheet feeding cassette to be set can be set by touching the OK button 1603. Alternatively, setting of sheet data to the sheet feeding cassette of the setting target that does not match the usable sheet feeding cassette attribute may be prohibited.

This processing will be described with reference to a flowchart illustrated in FIG. 17A and the like. Programs that run on the print control apparatus 102 according to the present embodiment are stored in, for example, the external storage device 309 illustrated in FIG. 3, and are loaded into the RAM 302 and executed by the CPU 301.

In step S1701, like in step S1601, the sheet management application acquires sheet data information. In step S1702, like in step S1602, the sheet management application checks the usable sheet feeding cassette attribute in the acquired sheet data information and the sheet feeding cassette of the sheet data setting target. If the usable sheet feeding cassette attribute matches the sheet feeding cassette to be set (YES in step S1702), the processing proceeds to step S1703. If the usable sheet feeding cassette attribute does not match the sheet feeding cassette to be set (NO in step S1702), the processing proceeds to step S1704. In step S1703, the sheet management application sets the sheet data to the sheet feeding cassette to be set and then terminates the sheet setting processing.

On the other hand, in step S1704, the sheet management application displays a warning screen indicating that the setting cannot be made because the usable sheet feeding cassette attribute is different from the sheet feeding cassette to be set. FIG. 17B illustrates an example of the warning screen. FIG. 17B illustrates a warning screen 1701, a warning message 1702, and a cancel button 1703. In step S1705, when the cancel button 1703 is touched, the sheet setting processing is terminated without performing the sheet setting.

Thus, according to the present embodiment, setting of sheet data to the sheet feeding cassette to be set that does not match the usable sheet feeding cassette attribute is prohibited. Accordingly, it is possible to avoid printing with an unfavorable quality based on an incorrect adjustment value or the like due to setting of an inappropriate sheet feeding cassette for the selected sheet type.

A third embodiment will be described below. In the first embodiment, the same usable sheet data is created simultaneously for a plurality of usable sheet feeding cassettes set on the sheet data creation setting screen 1001. However, depending on the type of a sheet, the sheet cannot be set in a specific sheet feeding cassette. Accordingly, when creating sheet data, it may be necessary to make a sheet data creation setting in consideration of basic attributes such as grammage and a size of sheet information, and usable sheet feeding cassette attributes.

Therefore, in the case of creating sheet data, the sheet feeding cassette that cannot be set may be determined from the basic attributes of the sheet information and the creation of sheet data on the sheet feeding cassette that cannot be set may be prohibited. This configuration allows the user to create sheet data without particularly considering sheet feeding cassette attributes in the case of creating sheet data.

Processing according to the present embodiment will be described with reference to a flowchart illustrated in FIG. 18. Programs that run on the print control apparatus 102 according to the present embodiment are stored in, for example, the external storage device 309 illustrated in FIG. 3, and are loaded into the RAM 302 and executed by the CPU 301.

After sheet information is set on the sheet data edit screen 901 illustrated in FIG. 9 (YES in step S1800), when the save button 904 is touched, the sheet management application checks the state of the checkbox 907 in step S1801. If the checkbox 907 is marked (YES in step S1801), the processing proceeds to step S1803. If the checkbox 907 is not marked (NO in step S1801), the processing proceeds to step S1802.

In step S1802, the sheet management application saves the sheet information set on the sheet data edit screen 901 as usable sheet data, and closes the sheet data edit screen 901 to terminate the usable sheet data creation processing.

In step S1803, the sheet management application checks whether the sheet indicated by the sheet data being created can be set in the usable sheet feeding cassette. If the sheet can be set (YES in step S1803), the processing proceeds to step S1804. If the sheet cannot be set (NO in step S1803), the processing proceeds to step S1808.

As a method for checking whether the sheet can be set, not only a determination method based on usable sheet feeding cassette attributes or the like, but also the following methods. That is, a method of sending an inquiry to the image forming apparatus 103 to ask whether the sheet data can be set to the sheet feeding cassette, and a method of actually setting the sheet data temporarily to the sheet feeding cassette and checking whether an error is returned. In the present embodiment, any of such methods may be employed.

In step S1804, the sheet management application opens the sheet data creation setting screen 1001, and when the user touches the save button 1004, the sheet management application creates sheet data in the usable sheet list.

In step S1805, like in step S1104 illustrated in FIG. 11, the sheet management application sets the sheet feeding cassette, which is checked as the usable sheet feeding cassette on the sheet data creation setting screen 1001, as the usable sheet feeding cassette attribute in the usable sheet feeding cassette pull-down menu 916. In step S1806, like in step S1105, the sheet management application sets, as a new name (text box 909), a name obtained by adding the name of the sheet feeding cassette to the name of the sheet data set as the sheet information name (text box 909).

In step S1807, when the save button 904 is touched, the sheet management application saves the sheet information set on the sheet data edit screen 901 as the usable sheet data and then terminates the processing. In step S1808, the sheet management application checks whether there is a sheet feeding cassette for which sheet data is not created, among the sheet feeding cassettes checked in the usable sheet feeding cassette setting area 1003. If there is no sheet feeding cassette for which sheet data is not created (NO in step S1808), the sheet data edit screen 901 is closed to terminate the processing. If there is a sheet feeding cassette for which sheet data is not created (YES in step S1808), the processing returns to step S1803 to perform the processing of steps S1803 to S1807 on the next sheet feeding cassette.

The processing of step S1804 may be performed between steps S1801 and S1802, like in the case of the flowchart illustrated in FIG. 11 according to the first embodiment. Furthermore, also in the processing of step S1802, it may be determined whether the sheet indicated by the sheet data being created can be set to the usable sheet feeding cassette, like in S1803.

Figure 18:
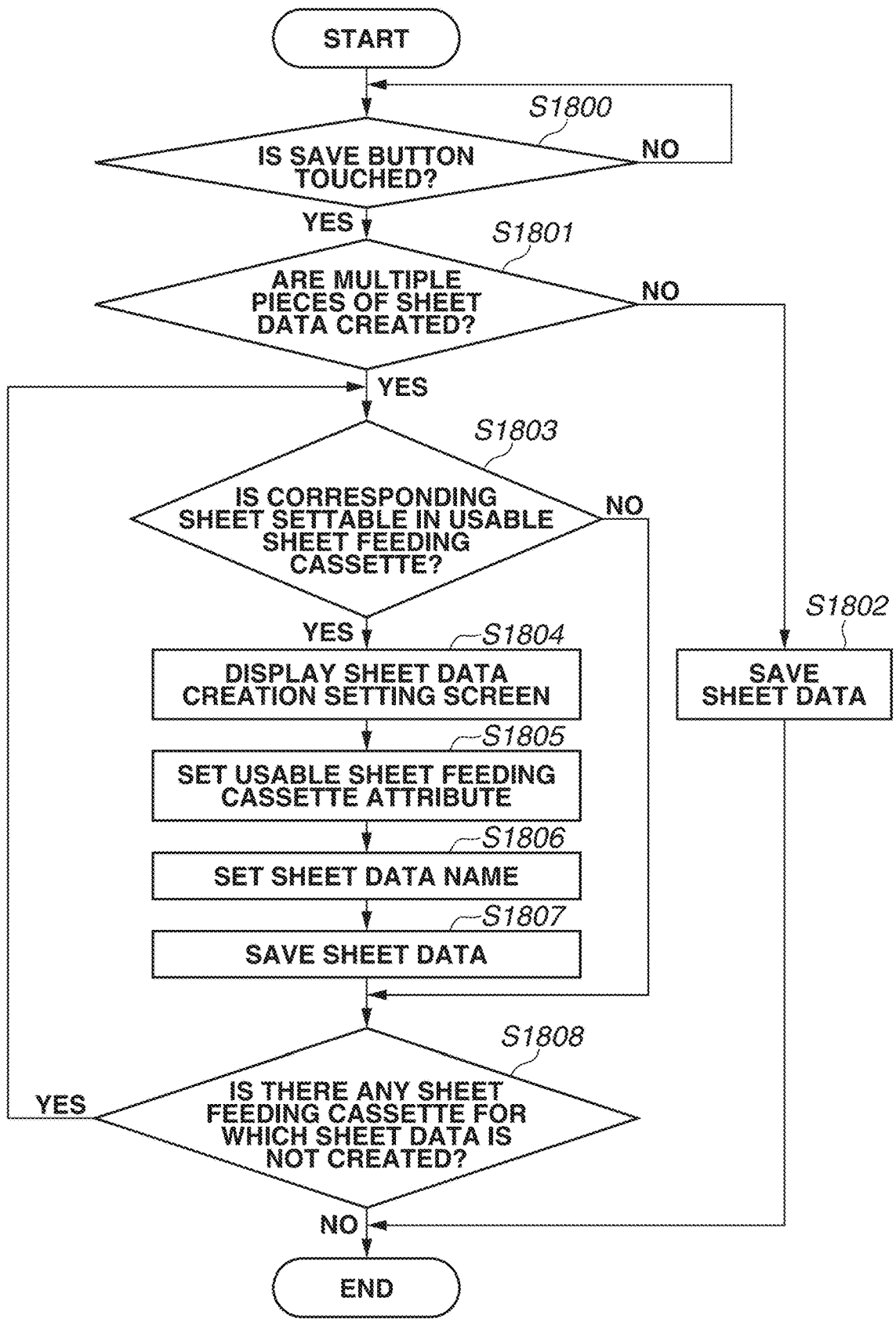
FIG. 18 is a flowchart illustrating sheet data creation processing according to a third embodiment.

Also, in the present embodiment, the processing described above with reference to FIGS. 12 to 15 can be incorporated in the sheet data setting processing on each sheet feeding cassette as illustrated in FIG. 18. Specifically, the processing may be executed in the sheet information setting processing prior to step S1800 and in the processing between steps S1806 and S1807. Consequently, the adjustment value information about each of usable sheet feeding cassettes for the same sheet type can be collectively set with a simple operation.

Thus, according to the present embodiment, in the sheet data creation processing for a plurality of usable sheet feeding cassettes illustrated in FIG. 11 according to the first embodiment, it is determined whether the sheet indicated by the sheet data being created can be set to the usable sheet feeding cassette, and the creation of sheet data on the sheet that cannot be set is prohibited. Accordingly, it is possible to avoid setting of an inappropriate sheet type to usable sheet feeding cassettes and to avoid printing with an unfavorable quality based on an incorrect adjustment value or the like.

A fourth embodiment will be described below. In the first embodiment, the same usable sheet data is created simultaneously for a plurality of usable sheet feeding cassettes set on the sheet data creation setting screen 1001. However, the usable sheet data may also be created simultaneously for a plurality of sheet sizes.

With this configuration, there is no need to perform usable sheet data creation processing on a plurality of usable sheet feeding cassettes for each sheet size, and the usable sheet data creation processing on a plurality of usable sheet feeding cassettes can be performed for a plurality of sheet sizes at once.

FIG. 19 illustrates an example of a sheet data creation setting screen 1901 according to the present embodiment. The sheet data creation setting screen 1901 may be a screen to be opened when the "setting" button 908 is touched in a case where sheet data for a plurality of sheet feeding cassettes is created simultaneously for a plurality of sheet sizes on the sheet data edit screen 901 illustrated in FIG. 9.

The sheet data creation setting screen 1901 includes a sheet size setting area 1902 for setting a plurality of sheet sizes, and checkboxes corresponding to the sheet sizes. Sheet data on marked sheet sizes is created simultaneously. The sheet data creation setting screen 1901 also includes a usable sheet feeding cassette setting area 1903 for setting a plurality of usable sheet feeding cassettes, a save button 1904, and a cancel button 1905. The usable sheet feeding cassette setting area 1903 is provided with sheet feeding cassette checkboxes respectively corresponding to the configuration of the sheet feeding cassettes of the image forming apparatus 103. Usable sheet data corresponding to the checked sheet feeding cassettes is created simultaneously.

In the case of the sheet data creation setting screen 1901 illustrated in FIG. 19, four types (A4, A3, SRA3, and B4) are checked as sheet sizes, and two types (deck 1 and deck 2) are checked as usable sheet feeding cassettes. Accordingly, usable sheet data about two types of sheet feeding cassettes for each sheet size is created simultaneously, so that eight types of usable sheet data can be created simultaneously.

In the sheet data creation setting screen 1901, the checkboxes are used. Instead of using the checkboxes, a preset sheet data creation setting area may be prepared to create usable data based on the created preset setting.

In the present embodiment, in the flowchart illustrated in FIG. 11 according to the first embodiment, the processing of steps S1104 to S1107 may be executed on all the selected sheets for each of the selected sheet feeding cassettes. In this case, like in the first embodiment, the processing described above with reference to FIGS. 12 to 15 can be incorporated in the sheet data setting processing for each sheet feeding cassette illustrated in FIG. 11. Specifically, the processing may be executed in the sheet information setting processing prior to step S1100 and in the processing between steps S1105 and S1106.

Programs that run on the print control apparatus 102 according to the present embodiment are stored in, for example, the external storage device 309 illustrated in FIG. 3, and are loaded into the RAM 302 and executed by the CPU 301.

According to the present embodiment, the adjustment value information about each of a plurality of usable sheet feeding cassettes for the same sheet type can be collectively set by performing a simple operation. In addition, the adjustment value information about each of a plurality of sheet types for the same sheet feeding cassette can be collectively set by performing a simple operation, and thus the setting processing can be more efficiently performed.

In the present embodiment, the second embodiment or the third embodiment may be applied.

The embodiment described above illustrates a case where the sheet information and adjustment values for the same sheet type are simultaneously set to a plurality of sheet feeding cassettes. Alternatively, the sheet information and adjustment values for different sheet types may be simultaneously set to the same sheet feeding cassette.

In that case, when the setting button 908 is touched on the sheet data edit screen 901 illustrated in FIG. 9, the sheet size setting area 1902 illustrated in FIG. 19 is displayed to select a plurality of sheet types. Further, the sheet data edit 901 is provided with a checkbox for simultaneously creating sheet data on a plurality of sheet types for the same sheet feeding cassette. After that, the flowchart illustrated in FIG. 11 may be corrected to simultaneously create sheet data about a plurality of sheet types for the same sheet feeding cassette.

In the embodiments described above, the sheet management application is described as an application that runs on the print control apparatus 102. However, the sheet management application is not limited to this application. For example, the sheet management application may run on the client computer 101 or the image forming apparatus 103 to achieve function effects similar to those described above.

An example where the present disclosure is applied to the print management system 100 including the image forming apparatus 103 and the print control apparatus 102 as illustrated in FIG. 1 has been described above. However, the present disclosure is not limited to this example, but instead can be applied to an image forming system having a configuration in which the image forming apparatus 103 and the print control apparatus 102 are integrated.

If there is a plurality of sheet feeding cassettes in which a plurality of sheets can be set, there is no need to specify a sheet feeding cassette, specify the type of a sheet (hereinafter referred to as a "sheet type"), and set an adjustment value for each of a plurality of sheet types or a plurality of sheet feeding cassettes. Specifically, if there is a plurality of sheet feeding cassettes in which a certain sheet type can be set, there is no need to specify a sheet feeding cassette, specify a sheet type, and set an adjustment value for each of a plurality of sheet feeding cassettes, so that the operation for setting an adjustment value for a plurality of sheet feeding cassettes can be simplified. If there is a plurality of sheet types that can be set for a certain sheet feeding cassette, there is no need to specify a sheet feeding cassette, specify a sheet type, and set an adjustment value for each sheet type.

According to the present embodiment, adjustment value information about one or more usable sheet feeding cassettes for one or more sheet types can be collectively set with a simple operation.

While the present disclosure has been described with reference to embodiments, it is to be understood that the disclosure is not limited to the disclosed embodiments. The scope of the following claims is to be accorded the broadest interpretation to encompass all such modifications and equivalent structures and functions.

This application claims the benefit of Japanese Patent Application No. 2017-145104, filed Jul. 27, 2017, which is hereby incorporated by reference herein in its entirety.

What is claimed is:

1. A system which sets sheet information in accordance with any one of a plurality of sheet accommodating devices, the system comprising:
a user interface that receives, as sheet information of a sheet, a setting value used for printing an image on the sheet and that designates a sheet accommodating device to which the sheet may be set from among the plurality of sheet accommodating devices; and
a database that stores sheet information including the setting value and identification information of the designated sheet accommodating device to which the sheet may be set from among the plurality of sheet accommodating devices,
wherein the user interface further selects sheet information from among a plurality of pieces of the sheet information stored in the database,
wherein the system allows to set the selected sheet information to a sheet accommodating device of the plurality of sheet accommodating devices in a case where the sheet accommodating device of the plurality of sheet accommodating devices is same as the sheet accommodating device corresponding to the identification information included in the selected sheet information, and
wherein the system restricts to set the selected sheet information to the sheet accommodating device of the plurality of sheet accommodating devices in a case where the sheet accommodating device of the plurality of sheet accommodating devices is not same as the sheet accommodating device corresponding to the identification information included in the selected sheet information.

2. The system according to claim 1, further comprising a printing device which executes a job to print an image on the sheet in accordance with the setting value.

3. The system according to claim 1, wherein the setting value includes an adjustment value about a transfer voltage.

4. The system according to claim 1, wherein the system performs predetermined notification in a case where the sheet accommodating device of the plurality of sheet accommodating devices is not same as the sheet accommodating device corresponding to the identification information included in the selected sheet information.

5. The system according to claim 1, wherein the user interface designates two or more sheet accommodating devices in which the sheet may be set, and
wherein the database stores sheet information including the setting value and identification information of the two or more designated sheet accommodating devices.

6. The system according to claim 1, wherein the system is configured to communicate with a printing device which executes a job to print an image on the sheet according to the setting value.

7. The system according to claim 1, wherein the setting value includes an adjustment value about a print position of the image.

8. A method for a system setting sheet information in accordance with any one of a plurality of sheet accommodating devices, the method comprising:

receiving, as sheet information of a sheet, a setting value used for printing an image on the sheet and designating a sheet accommodating device to which the sheet may be set from among the plurality of sheet accommodating devices;

storing, in a database, sheet information including the setting value and identification information of the designated sheet accommodating device to which the sheet may be set from among the plurality of sheet accommodating devices;

selecting sheet information from among a plurality pieces of the sheet information stored in the database;

allowing to set the selected sheet information to a sheet accommodating device of the plurality of sheet accommodating devices in a case where the sheet accommodating device of the plurality of sheet accommodating devices is same as the sheet accommodating device corresponding to the identification information included in the selected sheet information; and restricting to set the selected sheet information in accordance with the sheet accommodating device of the plurality of sheet accommodating devices in a case where the sheet accommodating device of the plurality of sheet accommodating devices is not same as the sheet accommodating device corresponding to the identification information included in the selected sheet information.

9. A non-transitory computer-readable storage medium storing a program to cause a computer to perform a method for a system setting sheet information in accordance with any one of a plurality of sheet accommodating devices, the method comprising:

receiving, as sheet information of a sheet, a setting value used for printing an image on the sheet and designating a sheet accommodating device to which the sheet may be set from among the plurality of sheet accommodating devices;

storing, in a database, sheet information including the setting value and identification information of the designated sheet accommodating device to which the sheet may be set from among the plurality of sheet accommodating devices;

selecting sheet information from among a plurality pieces of the sheet information stored in the database;

allowing to set the selected sheet information to a sheet accommodating device of the plurality of sheet accommodating devices in a case where the sheet accommodating device of the plurality of sheet accommodating devices is same as the sheet accommodating device corresponding to the identification information included in the selected sheet information; and restricting to set the selected sheet information to the sheet accommodating device of the plurality of sheet accommodating devices in a case where the sheet accommodating device of the plurality of sheet accommodating devices is not same as the sheet accommodating device corresponding to the identification information included in the selected sheet information.

* * * * *